(12) United States Patent (10) Patent No.: US 8,037,305 B2
Rahman et al. (45) Date of Patent: Oct. 11, 2011

(54) SECURING MULTIPLE LINKS AND PATHS IN A WIRELESS MESH NETWORK INCLUDING RAPID ROAMING

(75) Inventors: Shahriar I. Rahman, Morgan Hill, CA (US); Nancy Cam-Winget, Mountain View, CA (US); Kalyan R. Dharanipragada, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

(21) Appl. No.: 11/771,027

(22) Filed: Jun. 29, 2007

(65) Prior Publication Data

US 2007/0250713 A1 Oct. 25, 2007

Related U.S. Application Data

(63) Continuation-in-part of application No. 11/456,045, filed on Jul. 6, 2006.

(60) Provisional application No. 60/779,891, filed on Mar. 6, 2006.

(51) Int. Cl.
*H04L 9/32* (2006.01)

(52) U.S. Cl. ............ 713/168; 713/153; 713/171; 726/4; 380/270

(58) Field of Classification Search ...... 726/4; 713/153, 713/168; 380/270
See application file for complete search history.

(56) References Cited

U.S. PATENT DOCUMENTS

| | | | |
|---|---|---|---|
| 7,046,647 B2 * | 5/2006 | Oba et al. ...................... | 370/331 |
| 7,707,415 B2 * | 4/2010 | Braskich et al. .............. | 713/168 |
| 7,804,807 B2 | 9/2010 | Korus et al. .................. | 370/338 |
| 7,814,322 B2 | 10/2010 | Gurevich et al. ............. | 713/171 |
| 2006/0013159 A2 * | 1/2006 | Gurevich ...................... | 370/328 |
| 2006/0215582 A1 | 9/2006 | Castagnoli et al. ........... | 370/328 |
| 2007/0121947 A1 * | 5/2007 | Sood et al. .................... | 380/277 |
| 2007/0153739 A1 * | 7/2007 | Zheng ........................... | 370/331 |
| 2007/0160017 A1 * | 7/2007 | Meier et al. ................... | 370/338 |
| 2007/0189247 A1 | 8/2007 | Wang et al. ................... | 370/338 |
| 2007/0189249 A1 * | 8/2007 | Gurevich et al. ............. | 370/338 |
| 2007/0250713 A1 | 10/2007 | Rahman et al. ............... | 713/171 |

(Continued)

OTHER PUBLICATIONS

Castagnoli, "How AWPP will make mesh networks easier to deploy", Retrieved from Wireless Net Designline, <URL: http://www.wirelessnetdesignline.com/howto/174900407>, on Dec. 5, 2005.

(Continued)

*Primary Examiner* — Nabil El Hady
(74) *Attorney, Agent, or Firm* — Dov Rosenfeld; Inventek

(57) ABSTRACT

A method and logic encoded in tangible media and apparatus for securing links between a mesh point and one or more identities of one or more parent mesh points of a wireless mesh network in order to secure the links. A first association is carried out to one of the identities of one of the parent mesh points. The first mesh point undergoes a mutual authentication with an authenticator and announces the possibility of multiple links and/or multiple paths. The authentication generates a first master key from which the root master key of the key hierarchy is derived so that other master keys for different identities are derivable using a hierarchy. The mesh point undergoes a 4-way handshake to derive a first transient key. Other transient keys are obtained by a fast roaming method without having to re-undergo a backend authentication, the other transient keys being for other links and/or paths and derived using the hierarchy.

45 Claims, 15 Drawing Sheets

U.S. PATENT DOCUMENTS

| | | | |
|---|---|---|---|
| 2008/0031155 A1* | 2/2008 | Korus et al. | 370/254 |
| 2008/0069105 A1* | 3/2008 | Costa et al. | 370/392 |
| 2008/0069348 A1* | 3/2008 | Walker et al. | 380/46 |
| 2008/0112363 A1 | 5/2008 | Rahman et al. | 370/331 |
| 2009/0323631 A1 | 12/2009 | Bajic | 370/331 |

OTHER PUBLICATIONS

Clancy, "Security Review of the Light-Weight Access-Point Protocol", Retrieved from University of Maryland, <URL: http://www.cs-umd.edu/~clancy/docs/lwapp-review.pdf>, on May 12, 2005.

Cheng et al, "Security Analysis of LWAPP", Retrieved from Universidad Jesuita de Guadalajara, <URL: kino.iteso.mx/~ivan/redes/ap/bibliografia/lwapp_g.pdf>, on Apr. 7, 2004.

Cam-Winget et al, "The Flexible Authentication via Secure Tunneling Extensible Authentication Protocol Method (EAP-FAST)", draft-cam-winget-eap-fast-03.txt, Retrieved from the Internet Engineering Task Force (IETF), <URL: http://tools.ietf.org/html/draft-cam-winget-eap-fast-03, Oct. 19, 2005.

Search report for related PCT Application, No. PCT/US07/62740, mailed on Feb. 20, 2008.

Sue Hares and Albert Lew, "Securing an 802.11 Network" *Wireless Net DesignLine*, Jun. 27, 2006, retrieved on Apr. 9, 2007 at http://www.wirelessnetdesignline.com/showArticle.jhtml?articleID=189602104.

W. S.Conner, J. Kruys, K. Kim, J. C. Zuniga, "IEEE 802.11s Tutorial," presented at IEEE 802 Plenary, Dallas, TX, Monday, Nov. 13, 2006. Retrieved on Apr. 9, 2007 at ww.ieee802.org/802_tutorials/nov06/802.11s_Tutorial_r5.pdf.

IEEE Std 802.11i-2004, IEEE, New York, NY. Available online at www.IEEE.org.

IEEE P802.11r/D1.0, Draft Amendment to IEEE Std 802.11-2005, IEEE, New York, NY.

IEEE Std 802.1X-2004, IEEE, New York, NY. Available online at www.IEEE.org.

Neal Castagnoli, "How AWPP will make mesh networks easier to deploy," Parts 1 and 2, by, in Wireless Net Design Line, Dec. 5, 2005, CMP Media LLC, 600 Community Drive, Manhasset, NY 11030, downloadable (Mar. 4, 2006) as www.wirelessnetdesignline.com/howto/174900638 and www.wirelessnetdesignline.com/howto/174900407 at www.wirelessnetdesignline.com.

T. Charles Clancy, "Security Review of the Lightweight Access Point Protocol", Department of Computer Science, University of Maryland, College Park, MD, May 2005. Available for download at http://www.cs.umd.edu/~clancy/docs/lwapp-review.pdf on May 25, 2006.

N. Cam-Winget, D. McGrew, J. Salowey and H. Zhou, The Flexible Authentication via Secure Tunneling Extensible Authentication Protocol Method (EAP-FAST), draft-cam-winget-eap-fast-03.txt, Network Working Group Draft, Oct. 19, 2005. Available online at http://www.ietf.org/internet-drafts/draft-cam-winget-eap-fast-03.txt.

T. Dierks and E. Rescorla, "The TLS Protocol Version 1.2," Internet Draft, <draft-ietf-tls-rfc4346-bis-00.txt>, Feb. 2006. Available online at http://www3.ietf.org/proceedings/06mar/IDs/draft-ietf-tls-rfc4346-bis-00.txt.

P. Calhoun, B. O'Hara, R. Suri, N. Cam-Winget, S. Kelly, M. Williams and S. Hares, Light Weight Access Point Protocol, Network Working Group, <draft-ohara-capwap-lwapp-03.txt>, Internet draft, Jun. 24, 2005. Available online at http://www3.ietf.org/proceedings/05nov/IDs/draft-ohara-capwap-lwapp-03.txt.

Z. Cheng, M. Nistazakis and R. Comley, "Security Analysis of LWAPP", 2nd International Workshop on Wireless Security Technologies IWWST-2004, London, UK, Apr. 2004. Available for download at www.cs.mdx.Ac.uk/staffpages/m_cheng/link/lwapp_g.pdf on May 25, 2006.

T. Dierks and C. Allen, "The TLS Protocol Version 1.0," Network Working Group, Standards Track, Jan. 1999. Available online at http://www.ietf.org/rfc/rfc2246.txt.

S. Blake-Wilson, M. Nystrom, D. Hopwood, J. Mikkelsen and T. Wright, "Transport Layer Security (TLS) Extensions", Network Working Group, Standards Track, Jun. 2003. Available online at http://www.ietf.org/rfc/rfc3546.txt.

* cited by examiner

*Output* = KDF-Length( *K, Label, Context*) where
Input:   *K* ← a 256 bit key derivation key
         *Label* ← a string identifying the purpose of the keys derived using this function
         *Context* ← a bit string that provides context to identify the derived key
         *Length* ← the length of the derived key in bits
Output ← a *Length*-bit derived key

*result* ← " "
*iterations* ← (Length + 255) / 256
do i = 1 to *iterations*
         *result* = *result* || HMAC-SHA256( *K*, I || *Label* || 0x00 || *Context* || *Length*)
od
return first *Length* bits of *result* and securely delete all unused bits

FIG. 6B

SECURING MULTIPLE LINKS AND PATHS IN A WIRELESS MESH NETWORK INCLUDING RAPID ROAMING

RELATED PATENT APPLICATIONS

The present invention is a continuation-in-part of U.S. patent application Ser. No. 11/456,045 to inventors Cam Winget et al., filed Jul. 6, 2006. Patent application Ser. No. 11/456,045 claims benefit of U.S. Provisional Patent Application Ser. No. 60/779,891 to inventors Cam Winget et al., filed Mar. 6, 2006. The contents of such U.S. Patent Applications 60/779,891 and U.S. Ser. No. 11/456,045 are incorporated herein by reference.

FIELD OF THE INVENTION

The present disclosure relates generally to wireless networks.

BACKGROUND

Wireless mesh networks are becoming common, e.g., in an outdoor environment for providing so-called hot spots for wireless local area networks (WLANs) conforming to the IEEE 802.11 standard. In a wireless mesh network, a set of mesh points are coupled by a backhaul network that typically forms a tree topology, at least one mesh point being the root of the tree topology, and coupled to a wired network that, for example, is coupled to the Internet. Some mesh points may also act as an access point (AP) so that one or more client stations may associate with them, and such a mesh point is called a mesh AP (MAP). Without loss of generality, each mesh point can be called a mesh AP. A non-AP mesh point, e.g., one that acts as a relay in the backhaul network, can simply be thought of as a mesh AP with the mesh AP functionality turned off, or without having the AP capability. In each tree structure of the backhaul network, one mesh AP is the root mesh point, and such a mesh point is called the root AP (RAP) herein.

Suppose a mesh AP wishes to join a mesh network as the child mesh AP of some parent mesh AP. Securing such a child mesh AP includes discovery wherein the child mesh AP receives advertisements from potential parent mesh APs and selects a parent mesh AP to join, association wherein the child mesh AP associates with the parent mesh AP, authentication wherein the child mesh AP undergoes an authentication, e.g., a shared-key authentication, or a certificate-based backend mutual authentication such as an IEEE 802.11x Extensible Authentication Protocol (EAP) authentication with an authentication server to obtain pairwise master keys (PMKs), followed by an 802.11i 4-way handshake using the PMK to obtain a pairwise transient key (PTK) for the child mesh AP to use to communicate with the parent mesh AP at L2. In the case that the AP functionalities of the mesh points is controlled by a controller using a protocol, securing the link includes the new child mesh AP joining the controller by forming a secure link, e.g., a secure tunnel to the controller so that the child mesh AP can function as an AP. It is desirable to provide for rapid roaming, so that when a connected mesh AP wishes to change its parent mesh AP, it need not undergo a complete authentication phase, e.g., a full IEEE 802.1x EAP authentication with an authenticator.

Multiple links (or "multilinks") and multiple paths (or "multipaths") are used for redundancy and load balancing purposes in a mesh network. Using Multilinks and multipaths are methods aimed at increasing mesh backhaul capacity. As one example of multilink, suppose a mesh AP includes two radios, and suppose one of the radios is used to connect to a parent mesh AP in the backhaul. Suppose the radio that forms such a primary link to the parent mesh AP in the backhaul cannot operate or there is a need to move to a different channel. One mechanism that provides a backup is to allow the second radio to form a secondary link to the parent mesh AP as an alternate link to the primary link. The backhaul is formed on one or the other link. While the secondary link can be secured in exactly the same way as the primary link using full authentication, e.g., mutual certificate-based authentication using an 802.1x EAP authentication followed by an 802.11i 4-way handshake to provide the pairwise transient key, it would be advantageous to have a mechanism that allows both the primary and secondary link to be secured at the same time, and that allows a change from primary to secondary link without having to undergo a full authentication.

As an example of multipath, suppose as another situation a mesh AP has more than one parent so that on the upstream there are two alternate paths to the root AP. Such a mechanism may be used for load balancing or to provide alternate paths to cover the case when a primary link on the path to the root AP may be down or unavailable. Having a secondary parent link and associate path to the root allows minimal downtime; no rediscovery of a new parent needs to occur. When such a second path is used, it is desirable to secure the secondary path to a second parent without having to carry out a complete authentication with an authenticator.

It also is possible to have multiple links and multiple paths simultaneously. That is, for example, a child mesh AP with two radios may have a primary and secondary link with a first parent, and as an alternate path, a primary and secondary link with a second parent.

Securing multiple links and paths in a mesh network is therefore important.

BRIEF DESCRIPTION OF THE DRAWINGS

FIG. 6B shows a definition of a key derivation function KDF-Length( ) as used in the key hierarchy of FIG. 6A according to an embodiment of the invention.

DESCRIPTION OF EXAMPLE EMBODIMENTS

Overview

Figure 1:
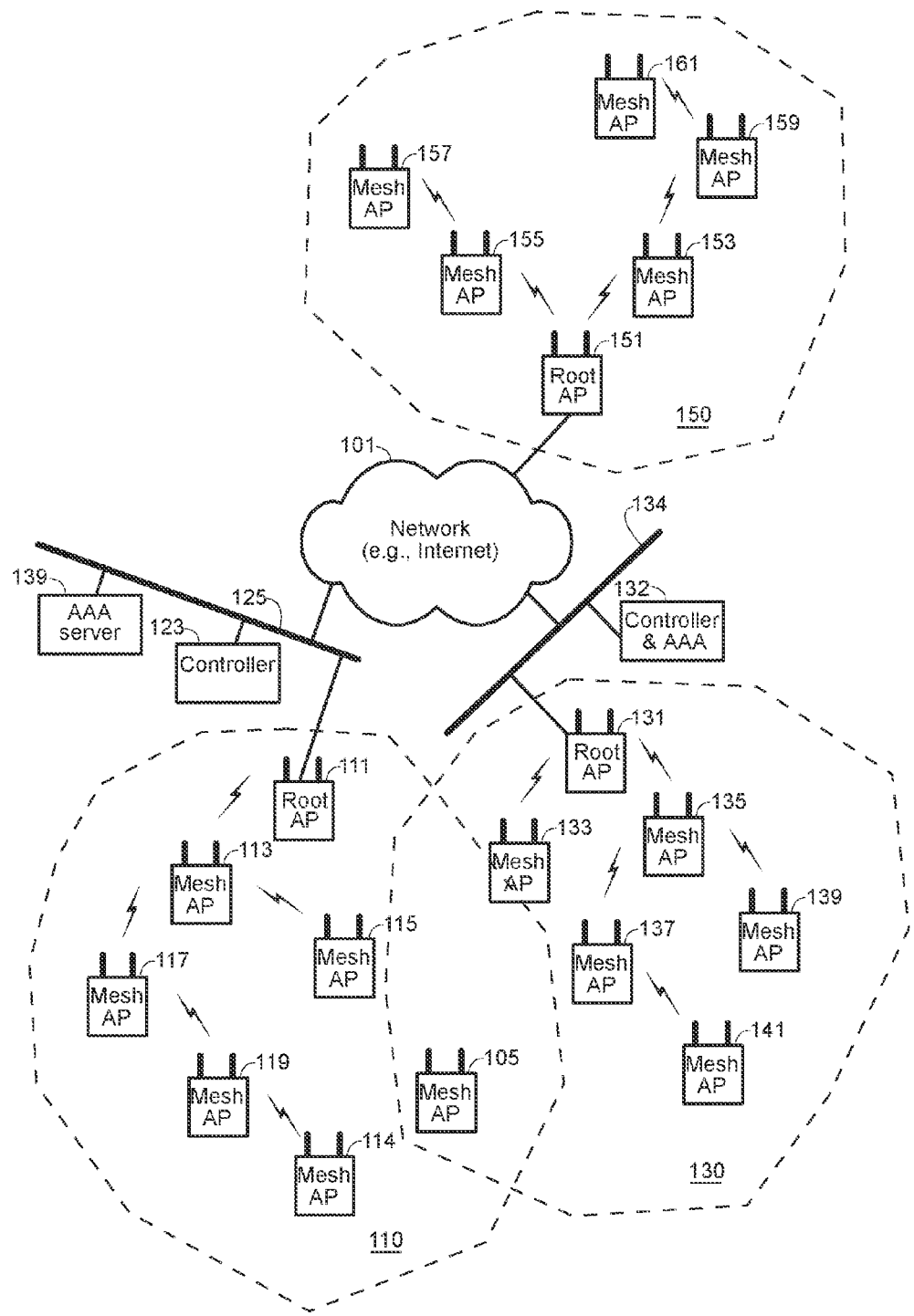
FIG. 1 shows an example mesh network environment in which one or more embodiments of the present invention can operate.

Embodiments of the present invention include a method, an apparatus, and logic encoded in one or more computer-readable tangible medium to carry out a method. The method is to provide security in a wireless mesh network, in particular, for single link including rapid roaming such that a child mesh point can roam to a new parent mesh point without having to undergo full re-authentication. Another embodiment is a method to provide security in a wireless mesh network that allows multiple links between mesh points, e.g., that allows multiple links on separate radios in a child mesh point to a parent mesh point (called "multilink"), or that allows a single child mesh point to connect to two or more parent mesh points (called "multipath") or that allows both multilink and multipath, including rapid roaming so that once a first link is secured the other links or paths can be secured using derived keys without having to undergo a complete re-authentication.

One embodiment includes a method in a mesh point, e.g., a mesh AP that is a child mesh point. The method includes the child mesh point associating with a first parent mesh point of a wireless mesh network as a child mesh point to the first parent mesh point, the first parent mesh point being coupled to an authenticator and a member of a mesh domain of the mesh network. The method further includes the child mesh point undergoing an authentication, e.g., a mutual authentication, e.g., a certificate-based mutual authentication, with the authenticator and thus authenticating to the mesh domain via the first parent mesh point of the mesh domain, the authentication resulting in a root pairwise master key of a multiple-identities-key hierarchy. The method also includes the child mesh point undergoing a 4-way handshake initiated by the child mesh point using the multiple-identities-key hierarchy to determine a transient key for the first child mesh point to securely communicate with the first parent mesh point in the mesh network.

One embodiment includes a method in a mesh point, e.g., a mesh AP that is a child mesh point. The method includes the mesh point associating with a first parent mesh point of a wireless mesh network as a child mesh point, the first parent mesh point being coupled to an authenticator in a mesh domain of the network. The method also ncludes the first child mesh point undergoing an authentication to the mesh domain, e.g., a mutual authentication, e.g., a certificate-based mutual authentication, using the authenticator via the first parent mesh point of the mesh network, the authentication resulting in a first pairwise master key that is a root of a multiple-identities-key hierarchy, the hierarchy being usable to define how to determine derived master keys based on the first pairwise master key that is the result of the authentication. The method further includes undergoing a 4-way handshake to determine a transient key for the child mesh point to securely communicate with the first parent mesh point in the mesh network. The method is arranged such that a new link between the child mesh point and a new different parent mesh point is securable by a new pairwise transient key determined according to the multiple-identities-key hierarchy without the child mesh point needing to re-undergo a full authentication.

In one version, the method further includes the child mesh point rejoining the mesh network via a second parent mesh point of the mesh domain, including associating with the second parent mesh point and securing the link between the child mesh point and the second parent mesh point using a new pairwise transient key determined according to the multiple-identities-key hierarchy without the child mesh point re-undergoing an authentication.

One embodiment includes a method in a mesh point, e.g., a mesh AP that is a child mesh point. The method includes receiving a neighbor advertisement from a first parent mesh point of a wireless mesh network, the first parent mesh point part of a mesh domain and coupled to an authenticator of the mesh domain, and sending an association request to the first parent mesh point, the association request including a multiple identities information element listing the multiple identities of the child mesh point. The method further includes undergoing an authentication, e.g., a mutual authentication, e.g., a certificate-based mutual authentication, with the authenticator via the first parent mesh point, the authentication resulting in a first pairwise master key usable to generate a multiple-identities-key hierarchy, wherein the authentication including authenticating the multiple identities listed in the multiple identities information element and resulting in an authorization to use the multiple-identities-key hierarchy to derive keys for securing links between any of the multiple identities and the parent mesh point. The method also includes using the multiple-identities-key hierarchy of derived keys to determine one or more derived master keys based on the first pairwise master key that is the result of the authentication and authorization, and undergoing a 4-way handshake initiated by the child mesh point as supplicant to determine a transient key for a selected identity of the child mesh point to secure communication between the selected identity and the first parent mesh point in the mesh network. The method is arranged such that a new link between a different identity of the child mesh point and the first parent mesh point is securable by a new pairwise transient key determined according to the key hierarchy without the child mesh point needing to re-undergo a full authentication.

One embodiment includes a method in a mesh point, e.g., a mesh AP that is a child mesh point. The method includes receiving one or more advertisements from one or more parent mesh points of a wireless mesh network, each parent mesh point being in a mesh domain, an advertisement from a parent mesh point that has a plurality of identities including a multiple identities information element listing the multiple identities of the parent mesh point, the one or more advertisements including a multipath indication to indicate that the respective parent mesh point allows association from a child mesh point on a path of a plurality of paths. The method also includes sending an association request to a first parent mesh point, the first parent mesh point being one whose advertisement was received and whose advertisement includes a multipath indication, the first parent mesh point being coupled to an authenticator of the mesh domain, the association request including a multiple identities information element listing the multiple identities of the plurality of parents of the multiple paths that the child mesh point desires to have. The method further includes undergoing an authentication, e.g., a mutual authentication, e.g., a certificate-based mutual authentication, with the authenticator via the first parent mesh point, the authentication resulting in a first pairwise master key usable to generate a multiple-identities-key hierarchy, wherein the authentication including authenticating the multiple paths between the child mesh point and the parent mesh point identities listed in the multiple identities information element and resulting in an authorization to use the multiple-identities-key hierarchy to derive keys for securing links between the child mesh point and any of the parent mesh point identities. The method also includes using the multiple-identities-key hierarchy of derived keys to determine one or more derived master keys based on the first pairwise master key that is the result of the authentication and authorization, and undergoing a 4-way handshake initiated by the child mesh point as supplicant to determine a transient key to secure communication between the selected identity and the first parent mesh point in the mesh network. The method is arranged such that a new path between the child mesh point and a different parent mesh point identity is securable by a new pairwise transient key determined according to the key hierarchy without the child mesh point needing to re-undergo a full authentication.

One embodiment includes a method in a mesh point, e.g., a mesh AP that is a child mesh point. The method includes the child mesh point associating with a first parent mesh point of a wireless mesh network, the first parent mesh point being coupled to an authenticator of a mesh domain, wherein one or both of the child mesh point or the first parent mesh point has multiple identities, wherein the first parent mesh point is one of a set of one or more parent mesh points to which the child mesh point requests to form one or more paths. One or more of the following is true:

the first parent mesh point has one or multiple identities, the first parent mesh point allows association from a child on a path of a plurality of paths, and the child mesh point desires to authenticate multiple paths including a path to the first parent mesh point;

the child mesh point has multiple identities, and the child mesh point desires to authenticate multiple links via its multiple identities, including associating one of its links with the first parent mesh point or with an identity of the first parent mesh point in the case the parent mesh point has multiple identities, In the method, in the case that the first parent mesh point has multiple identities, the associating including the child mesh point responding to receiving a neighbor advertisement from the first parent mesh point that included a multiple identities information element listing the multiple identities of the first parent mesh point.

In the method, in the case that the first parent mesh point allows association from a child on a path of a plurality of paths and the child mesh point desires to associate with the first parent mesh point or with an identity of the first parent mesh point to form one of multiple paths to a respective plurality of parent mesh points or mesh point identities, the associating including the child mesh point responding to receiving a neighbor advertisement from the first parent mesh point that included an indication that the first parent mesh point accepts multiple path associations, and the associating including an association request to the first parent mesh point that includes a multiple identities information element listing the multiple identities of the plurality of parent mesh points or parent identities of the multiple paths.

In the method, in the case the child mesh point has multiple identities, the associating including an association request to the first parent mesh point that includes a multiple identities information element listing the multiple identities of the child mesh point, and The method further includes the child mesh point undergoing an authentication, e.g., a mutual authentication, e.g., a certificate-based mutual authentication, with the authenticator via the first parent mesh point, the authentication resulting in a first pairwise master key usable to generate a multiple-identities-key hierarchy, wherein the authentication including authenticating the multiple identities listed in the multiple identities information element or elements and resulting in an authorization to use the multiple-identities-key hierarchy to derive keys for securing links that include any of the multiple identities. The method further includes using the multiple-identities-key hierarchy of derived keys to determine one or more derived master keys based on the first pairwise master key that is the result of the authentication and authorization, and undergoing a 4-way handshake initiated by the child mesh point as supplicant to determine a transient key to secure communication between the child mesh point or an identity thereof in the case of a multiple identity child mesh point and the first parent mesh point in the mesh network. The method is arranged such that a new link between the child mesh point or a different identity of the child mesh point in the case of a multiple identities child mesh point, and the first parent mesh point, or a different parent mesh point of parent mesh point identity in the case of multiple path to multiple parent mesh points or identities is securable by a new pairwise transient key determined according to the key hierarchy without the child mesh point needing to re-undergo a full authentication.

Particular embodiments includes logic encoded in one or more tangible media for execution by one or more processors of a processing system in a mesh point that wishes to become a child mesh point, and when executed causing the mesh point to carry out any of the methods described herein.

Particular embodiments include an apparatus in a mesh point that wishes to become a child mesh point in a mesh network, the apparatus comprising logic configured to carry out the steps of any of the methods described herein.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Mesh Network Security-Single Links

The case of a securing a mesh network having single links in the backhaul is first described.

FIG. 1 shows an example environment in which one or more embodiments of the present invention can operate. FIG. 1 shows three mesh networks 110, 130, and 150 each coupled to a network 101, e.g., the Internet. Mesh networks 110, 130, and 150 each include mesh points including a root AP and at least one other mesh APs. Recall that as used herein, a mesh AP is a mesh point which may but does not necessarily include the AP functionality.

As an example, mesh network 110 includes a root AP 111 and several other mesh APs 113, 114, 115, 117 and 119 that, in a backhaul network 110, form a tree topology in which the root AP 111 is the root. The root AP is connected to a wired network 125 that is connected to the network 101. A mesh AP, e.g. mesh AP 105 to join the mesh network as a child mesh AP. In one embodiment, the mesh network is controlled by a controller 123 that is also coupled to the wired network 125. In the example, the mesh points are lightweight APs whose AP functionality is controlled by a controller, e.g., the controller 123. In different embodiments, a controller can be configured to control more than one function, so, in this example, the controller 123 is configured to control the mesh network, and further to control the AP functionality of one or more of the mesh APs including the root AP 111 and the other mesh APs 113, 114, 115, 117 and 119. In one embodiment, Cisco's Lightweight Access Point Protocol (LWAPP) is used between each mesh AP and the controller of the respective mesh AP to control the AP functionality of the mesh AP. LWAPP would be known to those in the art. A version of LWAPP is being standardized (2007) as an IETF draft under the name of Control And Provisioning of Wireless Access Points (CAPWAP) Protocol. See www~dot~capwap~dot~org, where~dot~denotes the period (".") in the actual URL. Such AP functionality controlled using LWAPP in one embodiment includes authentication between a mesh AP and the controller 123 of the mesh AP in relation to a mesh AP providing service to endpoints, that is, to client stations. An authentication server, e.g., an authentication authorization and accounting (AAA) server 139 is included for such authentication. In this example, the AAA server 139 is also coupled to the same network 125 as the controller. Other servers such as DHCP, WCS, and DNS servers may be present but are not shown as coupled to the network 124.

Mesh network 130, for example, includes a root AP 131 and several other mesh APs 133, 135, 137, 139 and 141 that, in a backhaul network, form a tree topology in which the root AP 131 is the root. Mesh network 150, for example, includes a root AP 151 and several other mesh APs 153, 155, 157, 159 and 161 that, in a backhaul network, form a tree topology in which the root AP 151 is the root. In the case of mesh network 130, the root AP 131 is connected to a wired network 134 that is connected to the network 101. In one embodiment, the mesh network 130 is controlled by a controller 132 that is also coupled to the wired network 134. All mesh points are assumed to be lightweight mesh APs, and the controller 132 is also configured to control the AP functionality of one or more of the mesh APs including the root AP 131 and the mesh APs 133, 135, 137, 139 and 141. Authentication is aided by an AAA server that in this example is implemented in the controller 132 coupled to the wired network 134.

Each mesh point can operate as a relay mesh point without AP functionality. Without loss of generality, a mesh point that has no AP functionality is still referred to as a mesh AP herein.

Not shown in all networks in FIG. 1 are domain name (DNS) server(s), DHCP server(s), wireless network control servers (WCS), and other servers that might be included in an actual deployment. Those in the art will understand that such servers can optionally be included, and how to include such servers would be clear to those in the art and will not be further explained herein. Also not shown are such network elements as switches and routers, and again, those in the art will understand that a wired network connection, say, between a root AP and a controller, might include many network elements such as switches and routers.

Figure 2:
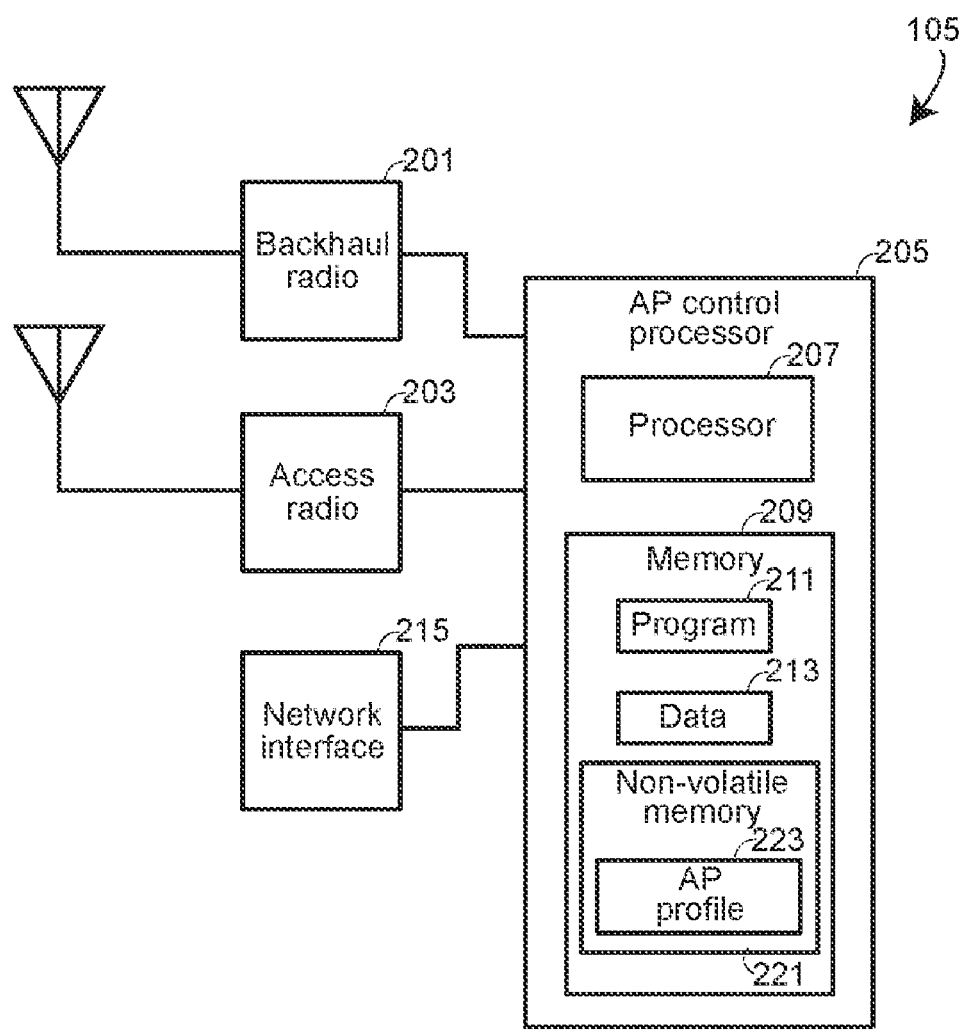
FIG. 2 shows an example mesh access point which includes a mesh access point embodiment of the invention.

FIG. 2 shows an example mesh AP, say mesh AP 105 that includes a backhaul radio interface 201 configured to connect to other mesh points to form a wireless mesh network, an access radio interface 203 operable to connect to one or more client stations, and an AP control processor 205 to which the backhaul and access radio interfaces are coupled. In one embodiment, the backhaul radio operates on a different frequency band than the access radio interface. In particular, the backhaul radio interface 201 is configured to communicate according to the IEEE 802.11a standard in the approximately 5 GHz band, and the access radio interface 203 is configured to communicate according to the IEEE 802.11b,g standard in the approximately 2.4 GHz band. Each radio interface includes a respective set of one or more antennas. In an alternate embodiment, the same radio band, and even the same physical radio is used for both backhaul communication with other mesh AP(s), and for access communication with any client stations of the mesh AP 105 when the mesh AP is part of a mesh network. The AP control processor 205 includes a programmable processor 207 and a memory 209. One or more features of the present invention operate in a mesh AP, and are embodied in the form of software programs 211 in the memory. Furthermore, one or more configuration parameters are stored in the memory 209 as data 213. The mesh AP 105 includes a non-volatile memory 221. In one embodiment, the non-volatile memory includes an AP profile 223 for the mesh AP. In one embodiment, the non-volatile memory also includes the authentication credential for the mesh AP, e.g., an X.509 certificate, a key or a username/password. The non-volatile storage for this authentication credential is in one embodiment secure.

Some versions of a mesh AP include a wired network interface 215 that enables the mesh AP to connect to a wired network, e.g., to operate as a root AP.

As already mentioned, some mesh points do not include the access radio and cannot operate as APs, but can act as mesh points in the backhaul mesh network. Such devices are still called mesh APs herein, as they are equivalent to a mesh AP whose access radio is off. There is no loss of generality in this.

In one embodiment, each mesh network includes a mesh network identifier, called herein a "mesh domain ID." Roaming, for example, occurs within the same mesh domain having the same mesh domain ID. More than one controller may be controlling mesh points, e.g., mesh APs within the same mesh domain.

The access point profile (AP profile) 223 in a mesh AP such as mesh AP 105 includes a security sub-profile that includes one or more entries for an indication of one or more different security policies that the mesh access point can support.

Figure 3:
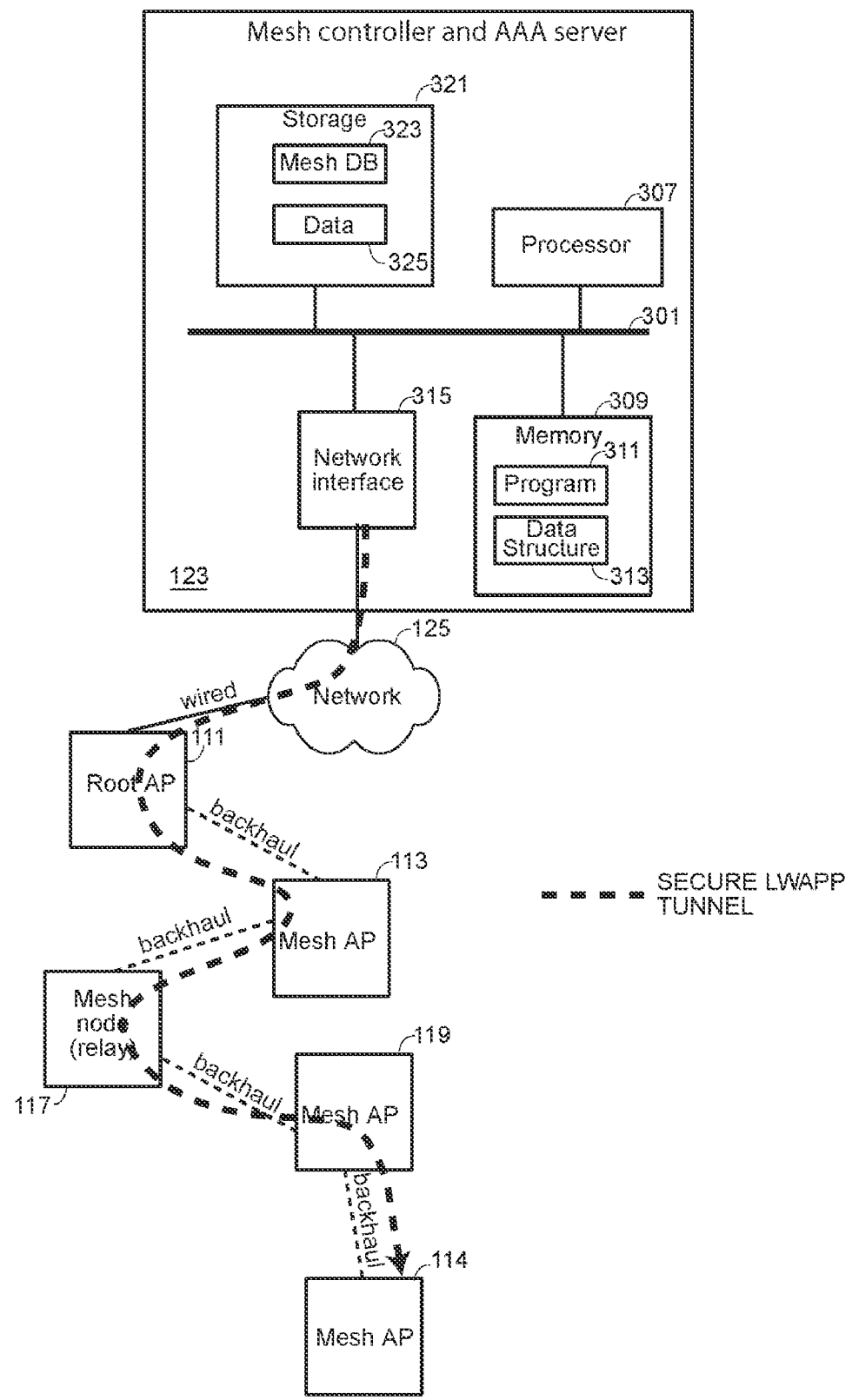
FIG. 3 shows part of a mesh network with an example mesh controller to control operation of the mesh network.

FIG. 3 shows part of the mesh network 110 with an example mesh controller 123 to control operation of the mesh network 110. FIG. 3 shows some of the elements of the controller 123 that is coupled to an AAA server 139. In some embodiments, the AAA server functionality may be in the same device as the controller. In the case that the AAA server is separate from the controller, the controller may be considered as an agent for the AAA server and passes information back and forth for the AAA server. In one embodiment, the controller and AAA server functionalities are implemented in the form of software stored in and executing in at least one processor of a processing system. The mesh controller 123 (in one case including the AAA server, in another case having the AAA server separate) includes at least one programmable processor 307, a memory 309, a storage subsystem 321, and a network interface 315, all coupled via a bus structure 301, which, for simplicity, is shown as a simple bus. Some of the features of the present invention operate on the mesh controller 123, and include software shown as program 311 stored in memory 309. The mesh controller maintains a mesh data structure 313 that includes information on the tree topology of the backhaul network, such a mesh data structure shown for simplicity in memory 309. The mesh data structure may use information stored in the storage subsystem 321, such information shown as a mesh database 323. Other data 325 is shown included in storage 321, and includes, for example, information on each mesh AP that is part of the network.

As can be seen, each mesh AP that is part of the mesh network 110 has a secure LWAPP tunnel to the controller 123. For example, mesh AP 114 has a secure LWAPP tunnel to the controller 123 via the intermediate mesh APs 119, 117, and 113 to the root AP 111 and then via the wired network 125. The secure LWAPP tunnel is shown by the (relatively thick) broken line ending in the arrow to the mesh AP 114.

Discovery and Authentication Phases of a Mesh AP Joining a Mesh: Single Links

Figure 4:
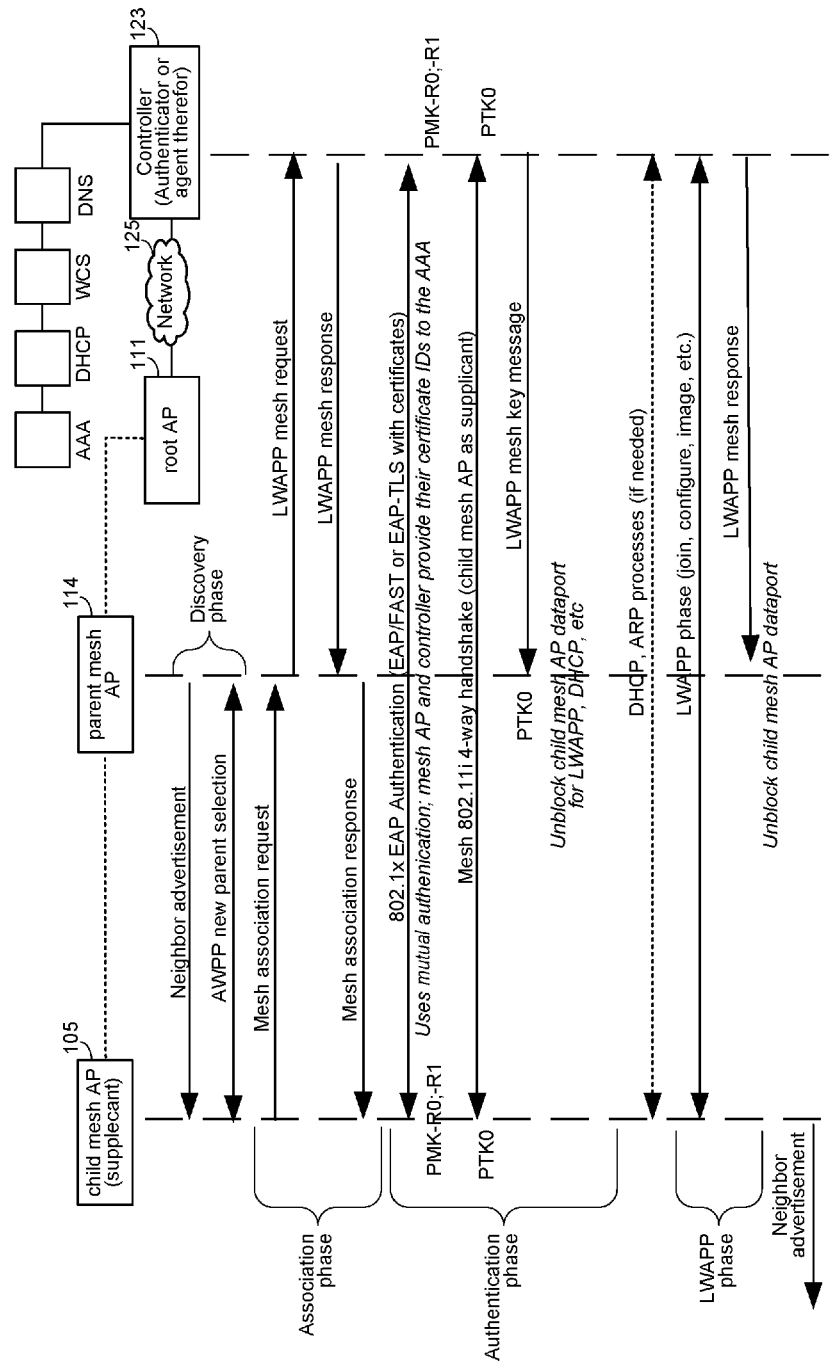
FIG. 4 shows messaging in one embodiment of a method of a potential child mesh access point joining an existing mesh network via a parent mesh access point, including using an embodiment of the present invention.
Figure 5:
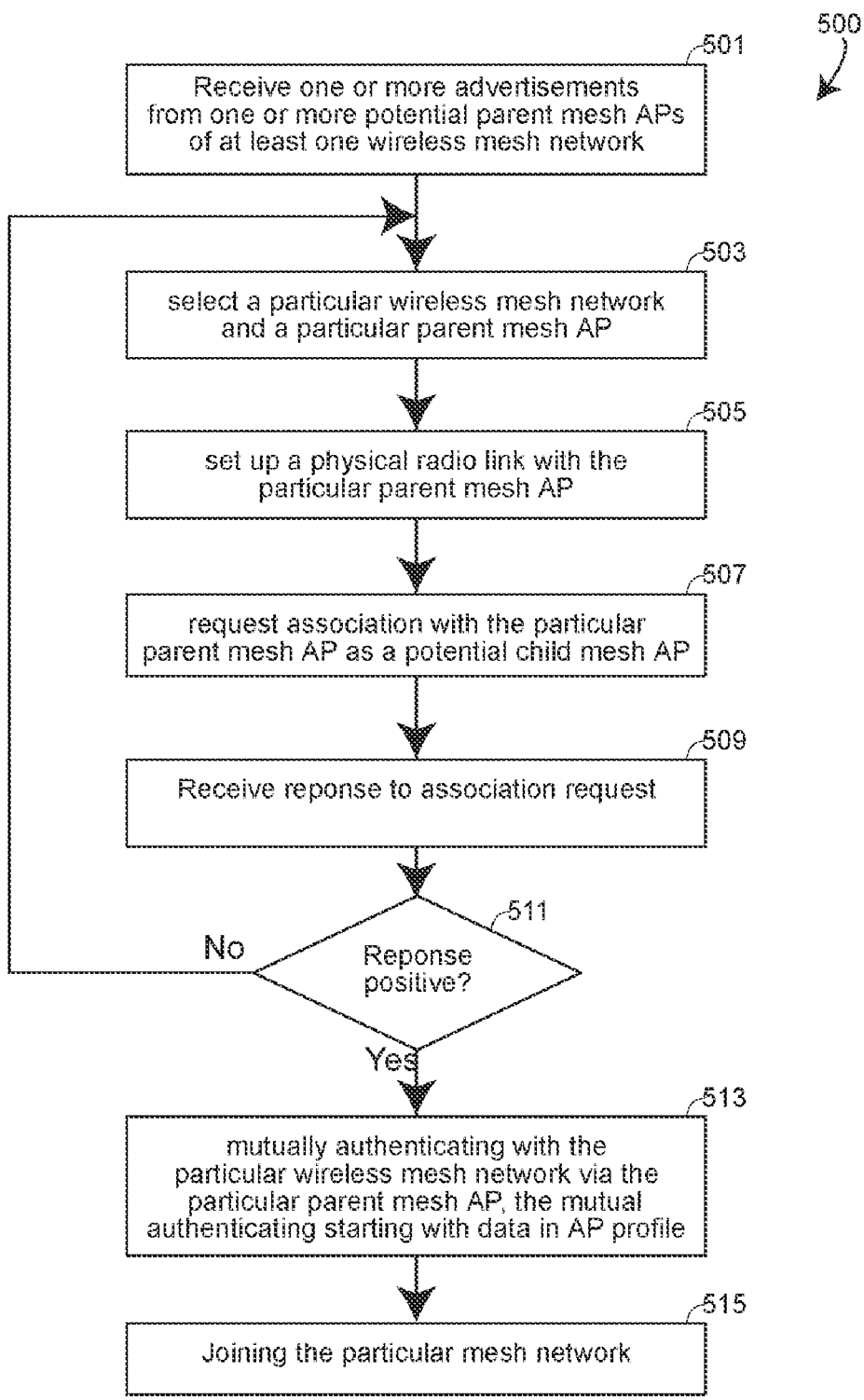
FIG. 5 shows a simplified flowchart of an embodiment of a method in a potential child mesh access point of joining a mesh network.

FIG. 4 shows messaging in one embodiment of a method of a potential child mesh AP, e.g., mesh AP 105 joining an existing mesh network, e.g., mesh network 110 via a parent mesh AP, e.g., parent mesh AP 114 connected via a secure LWAPP tunnel to the controller 123. FIG. 5 shows a simplified flowchart of an embodiment of a method 500 in a potential child mesh AP such as mesh AP 105 of joining a mesh network. The mesh AP includes an AP profile 223, e.g., in non-volatile memory 221. Several servers are shown in communication with the controller 123 in FIG. 4: an AAA server, a DHCP server, a domain name server (DNS server) and a wireless control server (WCS) are shown. Some of these servers may not be present in some embodiments. In one embodiment, the function of the AAA server is carried out in the controller 123.

A potential child mesh AP such as mesh AP 105 joining an existing mesh network includes a discovery phase and an authentication phase. One embodiment of the discovery phase for a mesh AP to discover a mesh network such as networks 110, 130, 150 uses a mesh network discovery protocol according to which mesh APs that are available as potential parent APs advertise themselves using advertisements ("neighborhood advertisements") that include information on how to join the mesh network, and a potential child mesh AP receives such neighborhood advertisements and decides whether or not to join the mesh network via the mesh AP that sent the received neighborhood advertisement. Many mesh discovery protocols are known. One example is from Cisco Systems Inc. (San Jose, Calif.) and is called Adaptive Wireless Path Protocol (AWPP). AWPP uses a network discovery mechanism based on mesh APs including mesh information in beacon frames that are regularly broadcast by the mesh APs. These are neighborhood advertisements broadcast by each mesh point that is fully-connected to a mesh network. A "full-connection" is defined as the mesh point having both an AWPP mesh link in the backhaul network and a secure LWAPP tunnel to a controller.

In one embodiment, mesh neighborhood advertisement frames, e.g., in beacon frames broadcast by a mesh AP are augmented with a mesh network identifier and one or more mesh security parameters, including information from the AP profile of the broadcasting mesh AP, e.g., from the security sub-profile. In one embodiment, this includes information on the type of authentication needed to join the network.

In one embodiment, a potential child mesh AP such as mesh AP 105 desiring to discover mesh networks in the vicinity does so by passive scanning, thereby listening for mesh beacons from "fully-connected" mesh points, e.g., neighborhood advertisement frames from mesh APs 113, 114, 115, 117, 119, mesh APs 133, 135, 137, 139, 141, and/or mesh APs 153, 155, 157, 159, 161. Referring to FIGS. 4 and 5, in one embodiment, a potential child mesh AP in 501 receives one or more advertisements from one or more potential parent mesh APs of at least one wireless mesh network, each mesh network having a mesh network identifier. In one embodiment, the mesh AP 105 caches all routing and security parameters encoded in mesh beacons and, in 503, uses the cached information, and one or more parameters, e.g., stored in the AP profile 223, to select a particular wireless mesh network to join, as characterized by a mesh network identifier, called the Mesh Domain ID herein, and a particular potential parent mesh AP within the particular wireless mesh network.

In one embodiment, a potential child mesh AP such as mesh AP 105 selects the parent mesh point using Cisco AWPP. In one embodiment, this uses information from the AP profile 223 stored in the potential child mesh AP 105 to determine if this mesh network is one to join, if this mesh network does or can provide the required services, and so forth, and whether the selected parent AP provides the QoS and services needed. This in addition to radio parameters to ascertain that the radio link between the child mesh AP and its potential parent mesh AP has sufficient radio signal properties.

Once the potential child mesh AP 105 selects the parent mesh AP, the child mesh AP and the parent mesh AP in 505 set up the physical radio link with the selected particular parent mesh AP, which may include appropriate channel selection and synchronization.

The Association Phase

The association phase of the mesh backhaul security protocol is analogous to a standard IEEE 802.11 client associating to a standard AP. The distinction is that the negotiation is to associate with the role of a mesh. Suppose for this example that the mesh AP 114 in mesh network 110 is selected by potential child mesh AP 105. There are four messages that flow in this phase between the child AP 105, the parent AP 114, and the controller 123:

1) The child AP 104 as infrastructure supplicant (IS) sends a Mesh Association Request in 507 including its security parameters needed to establish link security with its selected parent node (mesh point), the parent mesh AP 114 that is acting as an authentication agent (AA) for the authenticator— the controller 123. The security parameters of the child mesh AP in one embodiment are according to information in the security sub-profile in the AP profile 223.

2) The parent mesh AP 114 as AA encodes all the security elements of Mesh Association Request into a LWAPP Mesh Request. It then forwards LWAPP Mesh Request to the Authenticator (controller 123) using its LWAPP tunnel. This is similar to what an LWAPP AP does for a IEEE 802.11 client.

3) The Authenticator 123 receives the LWAPP Mesh Request, performs first-pass validation of the child mesh AP's (the supplicant's) security parameters and replies with LWAPP Mesh Response indicating whether the child mesh AP's association was successful or not.

4) The parent mesh AP 114, as the authenticator's agent, receives the LWAPP Mesh Response and sends a Mesh Association Response encoding the authenticator's association result in it.

Once the child AP 105 (the IS) receives the Mesh Association Response in 509 from the parent mesh AP 114 with success result, it proceeds to the authentication phase. If the response is negative, a different mesh network and/or parent mesh AP is/are selected in 503. Suppose in 511 the response to the association request is positive, i.e., the received response message includes a success result. The potential child mesh AP 105 proceeds to the mesh backhaul security protocol authentication phase.

The Authentication Phase

With the preceding association state, both parent proxy mesh point, i.e., the selected parent mesh AP 114, and the controller 123 should entitle the infrastructure supplicant mesh point, i.e., the potential child mesh point 105 to authenticate and request for authorization to gain access to mesh infrastructure as a mesh AP. Authnetication is with an authentication server (AS) which in one embodiment is the AAA server. Thus, in 513, the mesh AP 105 mutually authenticates with the particular wireless mesh network via the particular parent mesh AP, the mutual authentication using a credential specified by the AP profile.

In more detail, on the first contact (or by default configuration), the potential child mesh AP 105 acting as infrastructure supplicant mesh point goes through two cycles as follows.

In one embodiment, the first cycle is a certificate-based IEEE 802.1x/EAP mutual authentication cycle with the authentication server, e.g., an authentication server coupled to the controller 123, e.g., the AAA server 139, at the end of which both the child mesh AP 105 (the IS) and the controller obtain pairwise master keys (PMKs) for securing all communication between this mesh AP 105 and any mesh APs within the same mesh domain. Note also that while embodiments described herein use a certificate-based mutual authentication, the invention is not limited to such authentication, and other authentication methods may be used in alternate embodiments, e.g., shared-key authentication, open authentication, and even an authentication whereon either the server bases the authentication on the port ID, IP address or MAC address.

Furthermore, note that in the case IEEE 802.1x EAP authentication is used, in some alternate embodiments, EAP-TLS may be used for the IEEE 802.1x EAP authentication, the inventors selected EAP-FAST for one embodiment. EAP-FAST is a publicly accessible IEEE 802.1x EAP type developed by Cisco Systems, Inc., related to the assignee of the present invention, and available as an IETF RFC 4851. RFC 4851.

The second cycle once the potential child mesh AP 105, the controller, and the parent mesh AP 114 have the PMKs to use for this IS (mesh AP 105), the IS (child mesh AP 105) and the controller 123 undergo an IEEE 802.11i 4-way handshake cycle, at the end of which, both the IS (child mesh AP 105) and the controller 123 have a pairwise transient key (PTK), denoted PTK-R0.

In one embodiment, the inventors decided to make the handling and triggering of the IEEE 802.11i 4-way handshake substantially the same as that of the IEEE 802.11i standard, using the appropriate PMK as the starting known key, and starting with the child mesh AP as supplicant. By substantially the same is meant that the same state transition control, e.g., state machine can be used, but if needed, modified so that the child mesh AP (or child mesh AP identity) is the IS (infrastructure supplicant).

Note further that while the present invention assumed lightweight mesh APs that include a secure link, e.g., a secure to a controller, in alternate embodiments in which the mesh points do not use the controller, the certificate-based mutual authentication would end with a master key which can be used by both the parent mesh AP and the child mesh AP to obtain a transient key (PTK).

The second cycle—the IEEE 802.11i 4-way handshake's successfully completing results in information such that both the Controller and the child mesh AP can have a pairwise transient key denoted PTK-R0 for use via the particular AA (parent mesh AP 114). In the embodiment that uses lightweight mesh points, the parent mesh AP 114 does not yet have this key PTK-R0. However, because at this stage, the authenticator and Controller can securely communicate via a secure LWAPP tunnel with the parent mesh AP, the authenticator, e.g., Controller 123 sends the key PTK-R0 to the parent mesh AP 114 using an LWAPP mesh key message.

The LWAPP Join Phase

Once a child mesh AP 105 is authenticated, it may directly enter the LWAPP join phase with the controller 123 it had learned from its new parent node (mesh point) 114's mesh beacons, or from its AP profile. This is shown as 515: joining the selected particular mesh network in FIG. 5. Before the LWAPP Join phase is complete, the infrastructure supplicant mesh point 105 cannot accept any other mesh point as child on the backhaul network or accept any client on its access interface. Once the LWAPP Join phase is complete, the new child mesh AP 105 has a secure LWAPP tunnel to its controller 123. The mesh point 105 can only advertise mesh beacons and 802.11 beacons after completing the LWAPP phase.

Once the authentication phase is complete and the LWAPP join phase is complete, so that the child mesh AP 105 joins its chosen mesh network 110, in one embodiment, information on the mesh network 110, including how to join the mesh network and one or more characteristics, may be cached in the mesh AP for re-joining of the mesh network 110. In one embodiment, one or more of the cached information is added as part of the AP profile 223 of the mesh AP 105, including for example, the mesh domain ID of the mesh network 110. Also, in the case that rapid mesh network roaming is allowed, in some embodiments, information is cached in the mesh AP 105 for rapidly re-joining the mesh network 110 via the same parent or another parent mesh AP of the same mesh network. In one embodiment, one or more of the cached information is added in the AP profile 223 in the mesh AP 105.

Once the child mesh AP 105 has joined the mesh, it advertises its AP capabilities using beacon frames. In one embodiment, the beacon frames advertising the AP capabilities includes sending information determined using content from the AP profile 223. One particular embodiment of the invention includes a method comprising: transmitting in a mesh access point of a wireless mesh network one or more beacon frames to advertise the mesh APs capabilities for servicing wireless clients. Each beacon frame includes one or more parameters determined from content stored in an access point profile in the mesh access point. One embodiment includes setting up a physical radio link with a particular wireless client as a result of the particular wireless client receiving one of the beacon frames, receiving an association request from the wireless client to become a client of the mesh access point, ascertaining, e.g., using one or more parameters stored in the access point profile, whether or not the wireless client can associate with the mesh access point; and sending a response to the association request.

AP Re-Authentication: Single Mesh Links

In one embodiment, child mesh AP re-authentication occurs using a re-association step for mesh networks, using a mechanism that is a mesh-specific process that is similar to the process described in the soon-to-be established IEEE 802.11 standard mechanism for fast roaming, the IEEE 802.11r proposed standard, referred to herein as TG-r, based on the Mar. 1, 2006 Draft 2.1. Note that while some of the details of the TG-r process may change as the standard develops, the aspects as described herein are expected to be common, and even if not, how to modify those parts of the description to accommodate such changes should be clear to those in the art. Thus, by TG-r layer-2 fast roaming is meant the process substantially as described for providing fast layer-2 (IEEE) re-authentication so that a secure layer-2 link is established from a child mesh AP to the new parent mesh AP without requiring a full re-authentication.

Figure 6A:
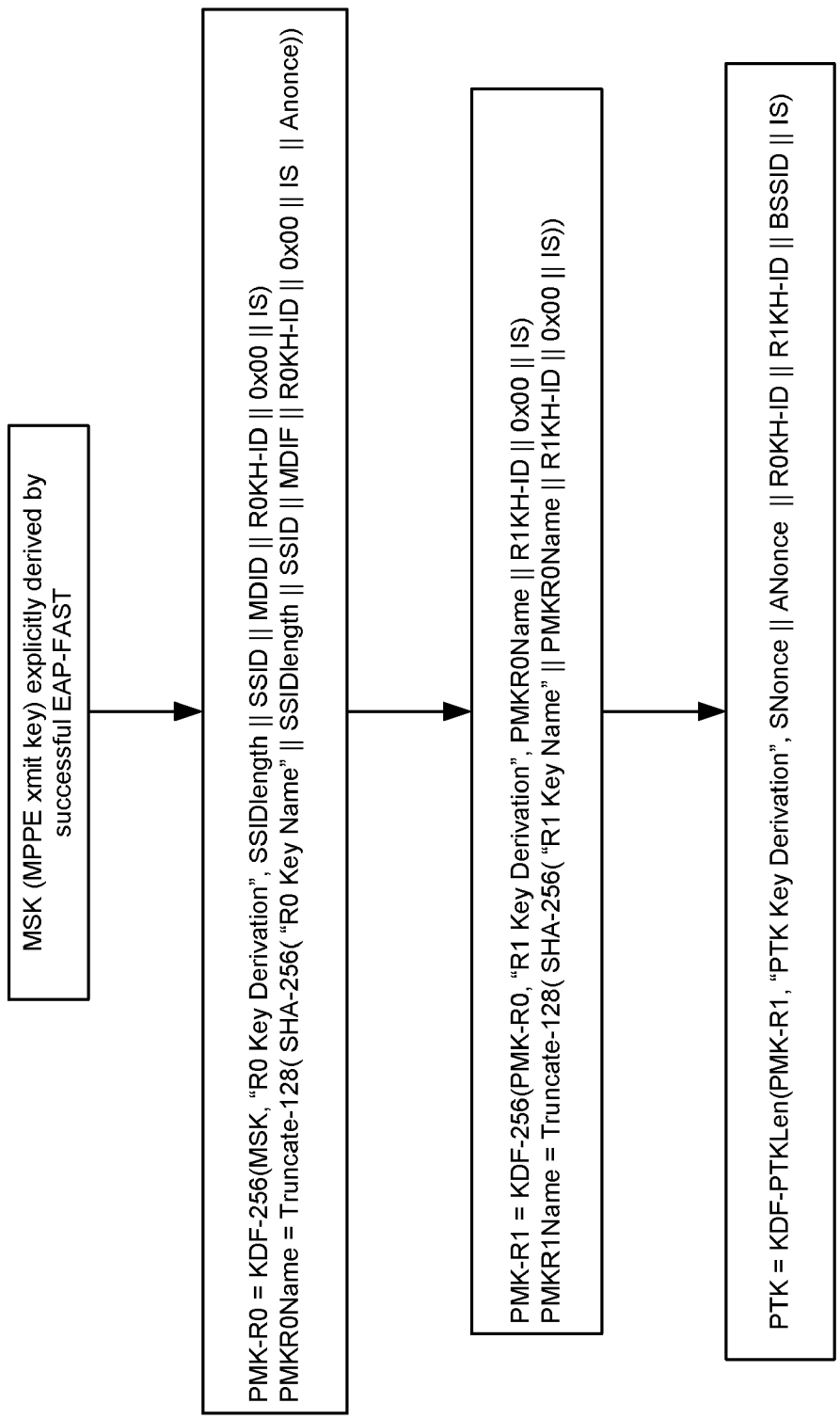
FIG. 6A shows a key hierarchy for rapid re-authentication according to an embodiment of the present invention.

Leveraging the TG-r fast transition base mechanism only, mesh points can rapidly establish a new and fresh pairwise transient key (PTK) security context with a subsequent parent mesh AP through the use of a key hierarchy. FIG. 6A shows a mesh-network key hierarchy for rapid re-authentication. Use of such a mesh-network hierarchy of derived keys based on a single master key avoids a child mesh AP having to re-undergo authentication, e.g., the 802.1x EAP authentication with the authentication server. New keys are derived using the hierarchy.

The notation in this description and FIG. 6A is a mesh-network adaptation of the hierarchy defined by the TG-r Draft 2.1. The key hierarchy is established to enable key separation and effective sharing of a single session authentication across the mesh. That is, a master shared key (MSK), or in one embodiment, the first PMK-R0 generated from MSK for a particular supplicant (denoted IS, for infrastructure supplicant) in a particular mesh domain is maintained by the controller, and is effectively shared across the mesh domain, that is, mesh APs (the mesh points), while allowing each mesh point to a have unique value to be used—derived from the PMK-R0 in one embodiment. Thus, when a mesh point first carries out authentication into an existing mesh network, it establishes a PMK-R0 from which it can then derive unique keys for each PMK-R1-key holder and in turn, for each radio or virtual BSSID (operating as an IS) within the mesh domain, according to the hierarchy.

In FIG. 6A, KDF-Length denotes a key derivation function. FIG. 6B shows one definition of the key derivation function KDF-Length( ), as defined in TG-r Draft 2.1, where Length denotes the length of the derived key. In FIG. 6A, MDID defines the mesh domain or group.

R0KH-ID is the controller's identity, in particular, the network access identifier (NAS-identifier) as presented to the authenticator, e.g., AAA server when the controller initiated the access request on behalf of the mesh AP that requested joining, acting as supplicant.

R1KH-ID is the AP-controller's or AP's identity, more specifically, the device identifier such as the NAS-identifier that affects the 4-way handshake or TG-r base mechanism to establish the PTK.

IS is the supplicant's identity, in this case the child mesh AP's, MAC address. One feature of the invention described in more detail below is that the child mesh AP can have multiple identities. In one embodiment, different supplicant identities are used: R0-IS, the supplicant's identity used to generate the PMK-R0 and R0Name; R1-IS, the supplicant's identity used to generate the PMK-R1 and R1Name, and IS (used for PTK derivation). For a child mesh AP, there would only be one identity, e.g., a "base" MAC address say for the R0-IS and R1-IS but many IS's, as is the case of a single radio that has multiple BSSIDs—so called virtual APs.

BSSID is the parent mesh AP's MAC address.

In TG-r these identifiers are 16 byte values. The 16 bytes may be derived from an actual NAS-identifier that is a string using a hash function.

The first time a mesh AP joins the mesh, it undergoes the process shown in FIGS. 4 and 5. Note, in the exchange shown in FIG. 4 and the flowchart of FIG. 5, the signaling for the 4-way handshakes include protection of the header used by AWPP for mesh backhaul routing and other so-called adjacency information. If this is the first time a mesh AP has joined the mesh, the supplicant is identified by the R0-IS and the controller is identified by R0KH-ID and the EAP mutual authentication results in PMK-R0 that is shared in the mesh. That is, this particular R0KH-ID controller maintains this PMK-R0 for deriving PMK-R1 for new parent mesh devices and this R0-IS supplicant. For example, any new controller, e.g., a controller having a controller identity (or device) R1KH-ID can request a new PMK-R0 for some device (R0-S) it is controlling.

Once a mesh AP has joined the mesh for the first time, e.g., using the mechanism shown and described in FIGS. 4 and 5, the mesh point—a child mesh AP—may roam to a new parent mesh AP for one reason or another. The roam may be within the same controller's domain, or to a new controller. In one embodiment, the signaling used to transition a mesh AP from one parent to another is the same for intra-controller and inter-controller roaming, so long as the roaming is within the same mesh domain—the same MDID. Such fast roaming avoids needing to use a full 802.11 mesh association and LWAPP join sequence, but rather uses the key hierarchy as shown in FIG. 6A to derive new keys—new PMK-R1.

Figure 7:
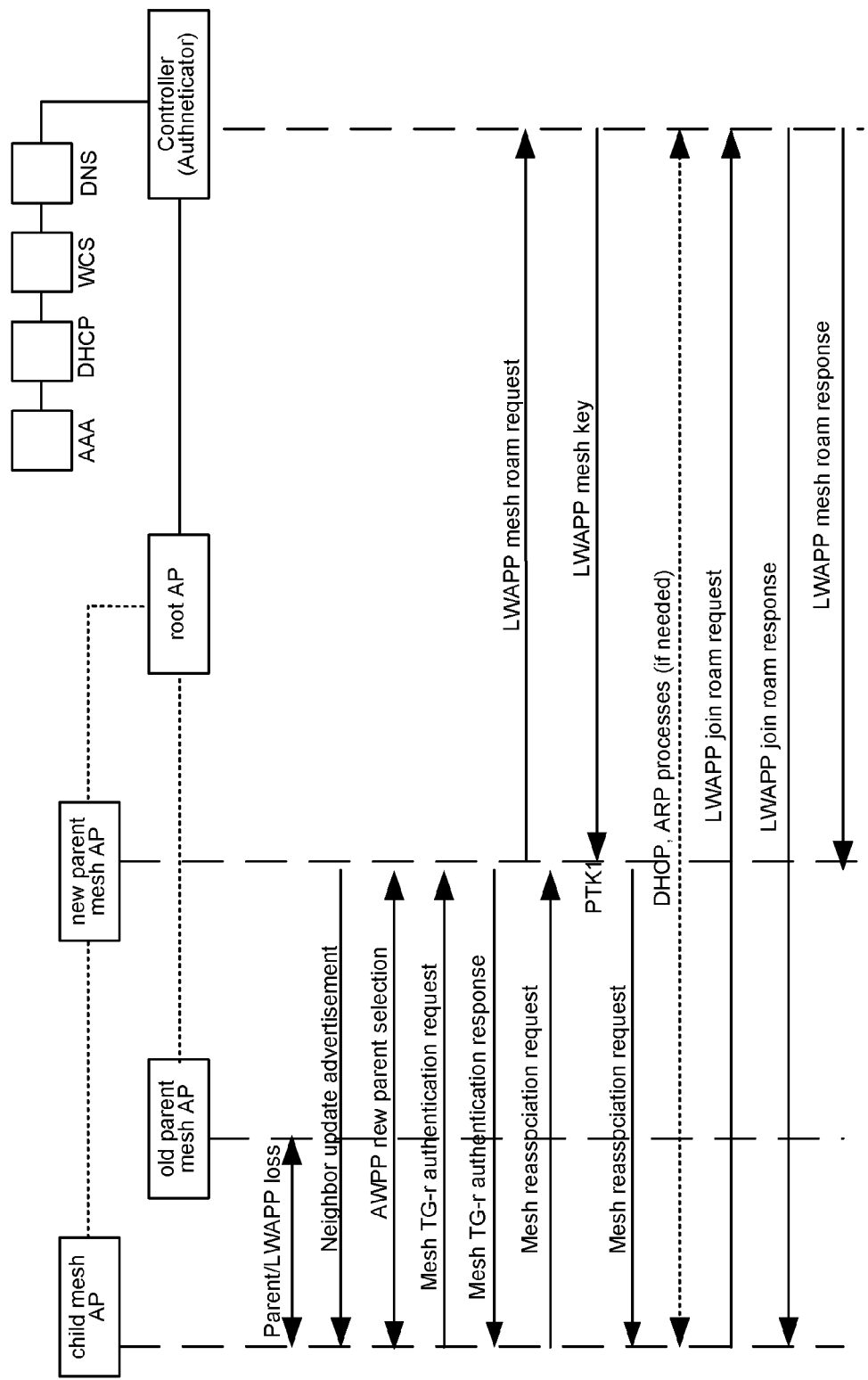
FIG. 7 shows a simplified drawing of the flow of an intra-controller transition wherein all current and new parent and child mesh access points share the same controller, the transition using a method embodiment of the present invention.

FIG. 7 shows the flow of an intra-controller transition wherein all current and new parent and child mesh APs share the same controller. The identity of the controller that first carried out the IEEE 802.1x EAP authentication is defined by R0KH-ID.

Figure 8:
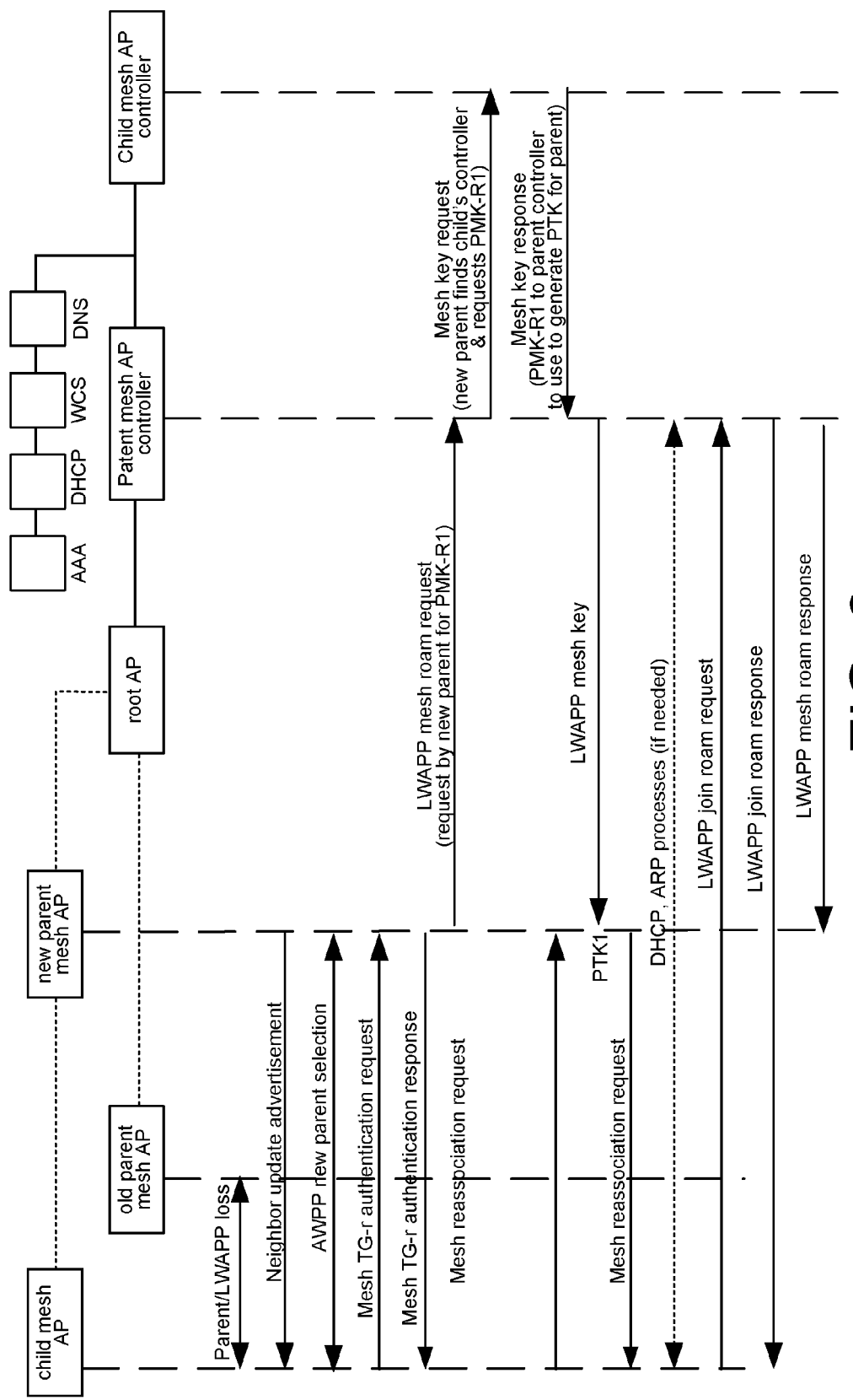
FIG. 8 shows a simplified drawing of the flow of an inter-controller transition wherein all current and new parent and child mesh access points have different controllers, the transition using a method embodiment of the present invention.

FIG. 8 shows the information flow in an example inter-controller transition. In this instance, the new parent mesh AP is in a different controller—has a different R0KH-ID—than the current parent and child's controller. Both controllers have the same mesh domain ID. The new parent mesh AP requests its controller to obtain its unique PTK. In turn, when the controller determines it does not have the PMK-R0, it searches and requests its PMK-R1 from the appropriate controller as identified by R0KH-ID.

The transition flow can be summarized as follows:

The supplicant mesh point—the roaming child mesh AP—initiates the rapid transition by sending the Mesh TG-r Authentication Request to the parent mesh AP with its SNONCE and PMKR0Name as defined above and assuring that it is in the same mesh domain ID as the authenticator. One embodiment assumed that mesh beacons contain a mesh point capabilities indication, which includes a "Fast Roaming" indication before the mesh point initiates this process. If a parent mesh AP does not support "Fast Roaming", the supplicant roaming mesh point must fallback and do a full first-contact association and authentication with this parent mesh AP. Furthermore, in one embodiment, the beacons also include its mesh domain ID and R0KH-ID.

The new parent mesh AP replies with its ANONCE and echoes the SNONCE, PMKR0Name and mesh domain ID by sending a Mesh TG-r authentication response message to the supplicant—the child mesh AP, and generates an LWAPP mesh roam request message to the parent mesh AP's controller to ensure that the child mesh AP requesting re-authentication is indeed authentic and authorized by requesting the PTK that corresponds to the new parent mesh AP and the child mesh AP.

If the new parent mesh AP and the supplicant—the child mesh AP share the same controller, the controller may preserve the LWAPP session, e.g., may buffer all frames for it, being aware that the child mesh point is roaming and it generates the next PTK locally.

If the roaming child mesh point is attached to a different controller within the same mobility/RF domain, e.g., same mesh domain ID, the authenticator or the root AP's controller connected to the authenticator in the case that the root AP acts as an authenticator agent, then sends a mesh key request message to the child mesh AP's controller, e.g., as learnt from its NASID or R0KH-ID, and obtains the PMK-R1 from the child mesh AP's controller. The child mesh AP's controller responds to the new parent mesh AP's controller's mesh key request message with a mesh key response message encoding the PMK-R1 for the parent mesh AP's controller in it. The parent mesh AP's controller may then generate the parent mesh AP's (and child mesh AP's) PTK, and replies with an LWAPP mesh roam reply message confirming the supplicant (child) mesh point's identity and includes the PTK—derived locally or fetched from another controller—in the message.

The child mesh AP (the supplicant mesh point), in the meantime, sends a mesh reassociation request message to the parent mesh AP, proving authenticity and liveness of the session by including the PMKR1Name and authenticating the mesh reassociation request message.

The new parent AP waits for its controller's response before it replies (the wait may not be necessary; the reply may already have been approved and the PTK distributed to the new parent AP), and then replies with a mesh reassociation response message to the roaming child mesh AP. Once the new parent AP has received the PTK from its controller, it may then validate the PMKR1Name and the MIC used to authenticate the mesh reassociation request packet. If both are valid, the mesh point responds with an authenticated mesh reassociation response message.

Once the roaming child mesh AP—the supplicant—receives the successful mesh reassociation response message, it waits until the LWAPP tunnel has been established or updated. Even in the event that the tunnel remains the same, the authenticator, or the new parent or root AP connected to the authenticator acting as an authenticator agent must wait for the LWAPP mesh response message that provides the information to unblock the port. This is required to ensure that the tunnel is up, live and established. Since the authenticator, or agent acting for the authenticator, e.g., parent or root AP connected to the authenticator can not distinguish whether the roaming child mesh AP needs to initiate a new tunnel, resume the tunnel or retain the already established tunnel, the controller must send this LWAPP mesh response message. In one embodiment, only the controller manages the state transitions for the roaming child mesh AP and the authenticator, or the root AP connected to the authenticator acting as an authenticator agent can not know unless this last packet is received.

Note that it may be that the roaming mesh point—the child mesh AP—cannot do extensive buffering for the frames it receives while re-association and re-authentication is in progress and may choose to drop both backhaul and access traffic as necessary. Note also that the LWAPP session remains intact under intra-controller roaming.

Multiple Identities: Multiple Paths and Multiple Paths

The above description is for a mesh network wherein the backbone contains single links between mesh APs, and wherein each mesh AP has a single parent mesh AP in the path to the root AP.

Multilink Network

Figure 9A:
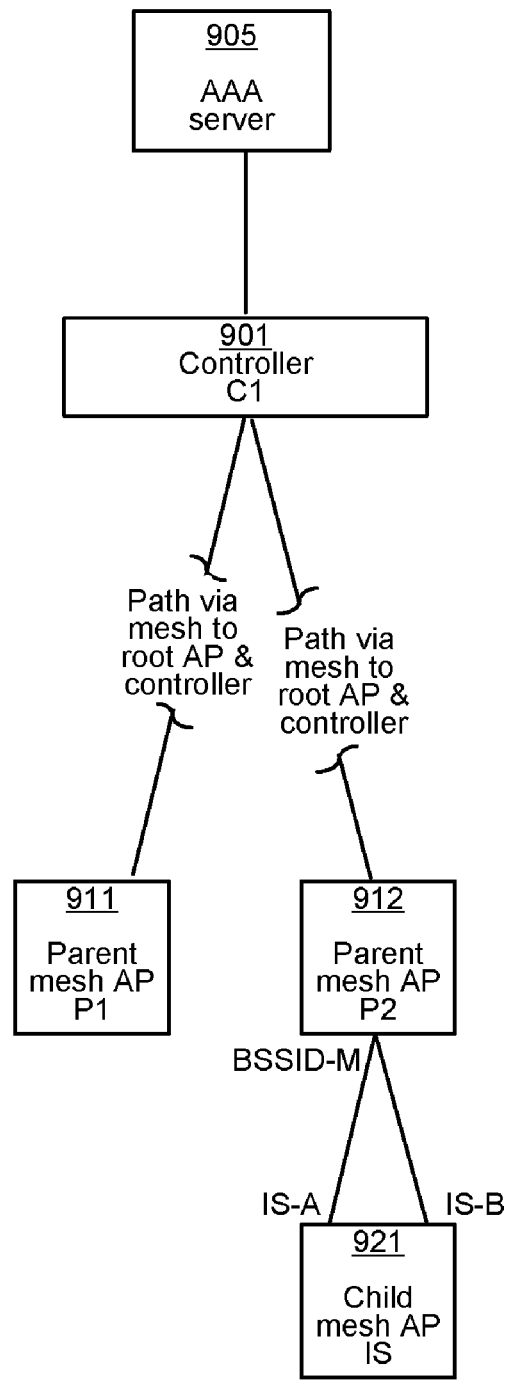
FIG. 9A shows a simple representation of a mesh network with a parent mesh access point that has a single identity and a child mesh access point that has two identities that illustrates multiple links, and wherein security can operate according to an embodiment of the present invention.

FIG. 9A shows a simple representation of a mesh network with two potential parent mesh AP's, parent mesh AP 911 denoted P1 and parent mesh AP 912 denoted P2. The parent mesh APs 911 and 912 have backhaul mesh paths via other mesh APs (not shown) on the way to a root AP (not shown), and suppose all the mesh APs are all lightweight APs coupled to, e.g., having LWAPP tunnels to, and controlled by a controller 901 denoted C1 coupled to the root AP. The controller C1 901 is in communication with an AAA server 905. Suppose a child mesh AP 921 receives the neighbor advertisements broadcast by mesh AP 912 and forms a backhaul link with the parent mesh AP 912 denoted P2.

Suppose the parent mesh AP 912 (P2) has a secure LWAPP tunnel to the controller, and suppose child mesh AP 921 has two radios—in general two identities, e.g., two BSSIDs—identified by IS-A and IS-B, so that the child is capable of forming two links with the parent mesh AP 912. Suppose the parent mesh AP has BSSID denoted BSSID-M, suppose the first link, between IS-A and BSSID-M, denoted by the pair [IS-A, BSSID-M], is part of the backbone network of the mesh to the root AP. One embodiment allows the mesh network to form an additional link from the child mesh AP 921 to the parent mesh AP 912 using the second radio (in general, second identity) of the child mesh 921. This is an example of what is called multiple mesh links ("multilink") herein: a single mesh AP being able to establish multiple links using distinct identities, e.g., distinct BSSIDs in the form of distinct radios or distinct virtual BSSIDs with another mesh AP. In the example of FIG. 9A, the multilink includes forming two possible links from two identities of the child mesh AP 921 to a single identity parent mesh AP 912. The backhaul to the root AP is formed on one or both of the first link [IS-A, BSSID-M]) or the other link (the second link [IS-B, BSSID-M]). One feature of the present invention is authorizing both links (in general, multiple links) using only a single full authentication. The mechanism described earlier and in FIGS. 4 and 5 can be used to secure the first link [IS-A, BSSID-M]. During this process, the child mesh AP, when requesting association, announces that it has two identities and is capable of multilink. While the second link can [IS-B, BSSID-M] be secured in exactly the same way as the first link using full authentication, e.g., using an 802.1x EAP authentication followed by an 802.11i 4-way handshake to provide the pairwise transient key, one embodiment of the present invention includes a single first authentication when the first link is formed, the first authentication leading to a key hierarchy being established according to which derive additional transient keys can be derived using, for example, a 4-way handshake for each link such as the second link [IS-B, BSSID-M], without having to undergo another full authentication. Such a mechanism essentially allows both the first and second link to be secured at the same time, and allows a change from first to second link without having to undergo another full authentication.

The child mesh AP, when it first associates with a controller 901 (C1) via the parent mesh AP 912, indicates that it wishes to form multiple links to the advertised BSSID-M using its two identities, e.g., two radios or two virtual BSSIDs IS-A and IS-B. One embodiment of the invention includes using a special, key hierarchy adapted for use in multiple identity situations, and called the "multiple-identities-key hierarchy" herein. The "multiple-identities-key hierarchy" provides for multiple hierarchies so that multiple links may be secured with only a single authorization. At the time the child mesh AP initiates association, it asserts that it wishes to use the multiple-identities-key hierarchy, and provides its desired identities IS-A and IS-B. This allows the child mesh AP to authenticate once, e.g., using EAP with the AAA server coupled to its controller C1. The multiple-identities-key hierarchy provides a root master key from which other master keys can be derived for deriving PTKs for both child identities IS-A and IS-B. Note that it is assumed that the parent mesh AP 912 has already established secured associations using BSSID-M.

Figure 9B:
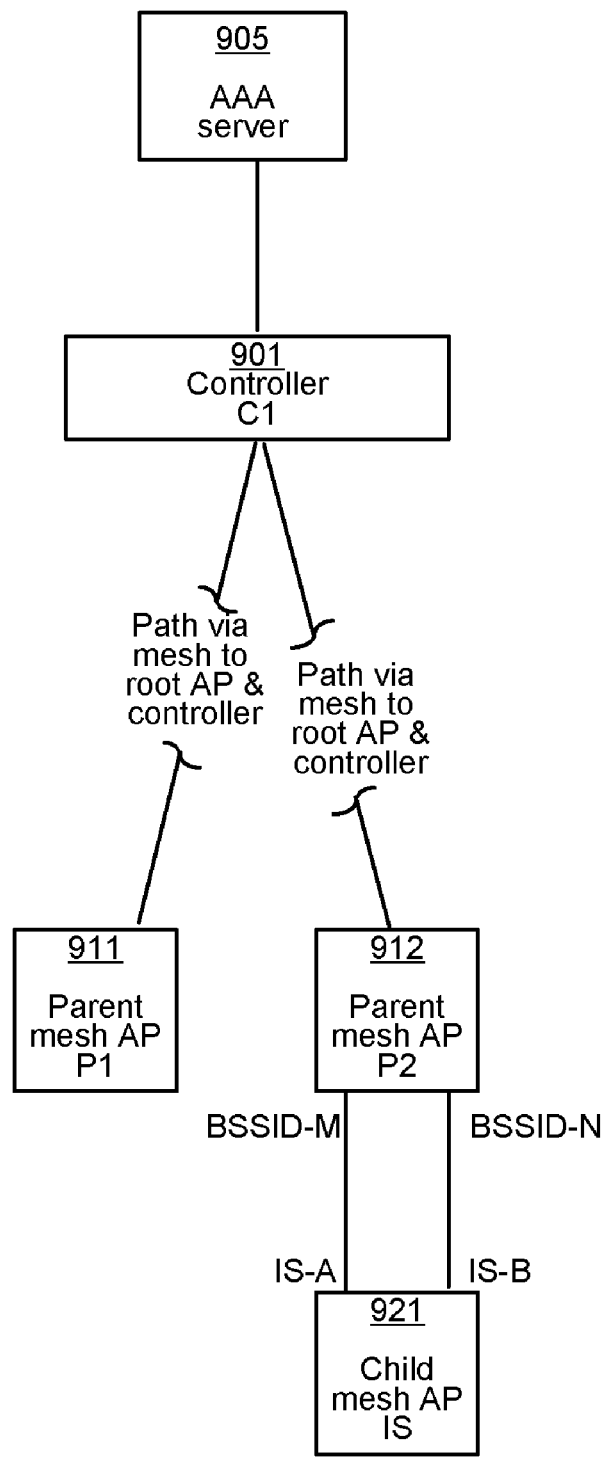
FIG. 9B shows a simple representation of a mesh network with a parent mesh access point that has two identities and a child mesh access point that has two identities that illustrates multiple links, and wherein security can operate according to an embodiment of the present invention.

FIG. 9B shows another arrangement used to describe another multilink case. Suppose Parent mesh AP 912 (P2) also has two identities, e.g., radios identified by BSSID-M and BSSID-N. Again, and the child identities are identified as IS-A and IS-B. Suppose a first link between the parent identity BSSID-M and the child identity IS-A, denoted [IS-A, BSSID-M] is part of the backbone network of the mesh to the root AP and forms a first link. One embodiment allows the mesh network to form an additional second link from child mesh AP 921 to the parent mesh AP 912 using the second respective radio of both the parent and child. This is another example of multilink. The two possible links from a child 921 to a parent mesh AP 912 include in this example the first link [IS-A, BSSID-M] and the other link—the second link [IS-B, BSSID-N]. One embodiment of the present invention provides for a single authentication when the first link is formed to define a single key hierarchy that is usable to derive additional transient keys, including a key for the second link without having to undergo another full authentication.

In such this example (FIG. 9B), the parent mesh AP 912 in its neighbor advertisements signals that is capable of forming multiple links to a child AP by including an a multilink IE that advertises its multilink capabilities, including its two identities BSSID-M and BSSID-N. The child mesh AP received such an advertisement. When the child mesh AP first associates with a controller 901 (C1) via the parent mesh AP 912 to form the first link, it indicates that it wishes to form multiple links to the advertised BSSID-M and BSSID-N using its two identities, e.g., two radios IS-A and IS-B, thus asserting it wishes to use the multiple-identities-key hierarchy. This allows the child mesh AP to authenticate once, e.g., using EAP with the AAA server coupled to its controller C1. The multiple-identities-key hierarchy provides a root master key from which other master keys can be derived for deriving PTKs for both child identities IS-A and IS-B. A 4-way exchange is used after authentication to derive the PTK for the [IS-A, BSSID-M] first link, such that the first link is established and secure. Note that it is assumed that the parent mesh AP 912 has already established secured associations using BSSID-M and BSSID-N. Should the need arise to use the second link, the PTK for the second [IS-A, BSSID-M] can be derived by another 4-way exchange using the multiple-identities-key hierarchy without the need for the identity of the child mesh AP 921 to undergo full authentication.

Multipath Network

Figure 9C:
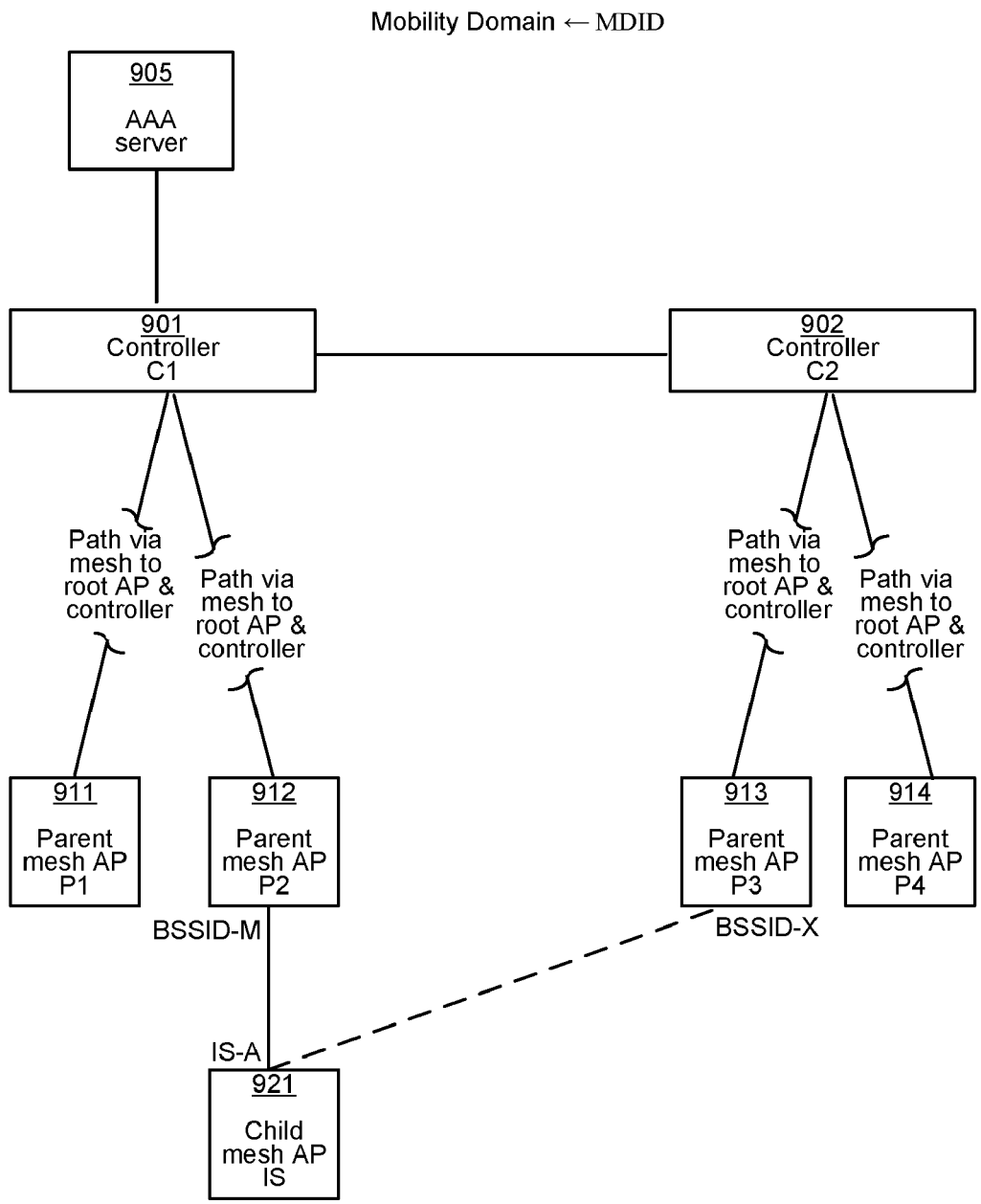
FIG. 9C shows a simple representation of a mesh network with a child mesh access point that can have two paths via different parent mesh access points that illustrates multiple paths, and wherein security can operate according to an embodiment of the present invention.

FIG. 9C shows another simple representation of a mesh network with the child mesh AP 921. The mesh network has four potential parent mesh AP's: parent mesh AP 911 denoted P1, parent mesh AP 912 denoted P2, parent mesh AP 913 denoted P3, and parent mesh AP 914 denoted P4. The parent mesh APs 911 and 912 have mesh links via other mesh points (not shown) to a first root AP (not shown) and are all lightweight APs coupled to, e.g., having LWAPP tunnels to, and controlled by a first controller 901 denoted C1, while the parent mesh APs 913 and 914 have mesh links via other mesh points (not shown) to a second root AP (not shown) and are all lightweight APs coupled to, e.g., having LWAPP tunnels to, and controlled by a second controller 902 denoted C2. The controller C1 901 is in communication with an AAA server 905. The two controllers 901 and 902 are coupled. All parent mesh APs are in the same mesh domain (also called mesh group).

Suppose a child mesh AP 921 includes a radio denoted IS-A for backhaul connection, and suppose parent mesh AP 912 issues advertisements on its BSSID denoted BSSID-M. Suppose child mesh AP 921 receives the neighbor advertisements broadcast by mesh AP 912 and forms a backhaul link with the parent mesh AP 912 denoted P2. The backhaul link is denoted [IS-A, BSSID-M]. The mesh AP 921 can now issue its own advertisements and have children. The path from child mesh AP 921 to parent mesh AP 912 is part of the mesh network.

Suppose in addition to the path via parent mesh AP 912, child mesh AP wishes for form an alternate path via another parent, say parent mesh AP 913 (P3) which broadcasts neighbor advertisements advertising BSSID-X, so that on the upstream, the mesh AP 921 has two different parents in the backhaul. This may be done for load balancing, or because the path to the parent mesh AP 912 may be down or unavailable, and it is desired not to have to go and discover a new parent. This is an example of what is called multiple paths ("multipath") herein: a single mesh AP, e.g., a single identity mesh AP is able to establish alternate paths with multiple different APs. Only one link to one parent mesh AP is active at any one time. In the example of FIG. 9C, forming two possible paths from a child 921, one to a parent mesh AP 912, the other to a mesh AP 913. The upstream backhaul to a root AP is formed on either one (the primary path [IS-A, BSSID-M]) or the other path (the secondary path [IS-A, BSSID-X]). One function of the present invention is authenticating both paths in a single authentication—when only one of the paths is first authenticated. That is, suppose the child mesh AP has received advertisements from both mesh AP 912 and parent mesh AP 913. Note that parent mesh AP 912 has controller 901 denoted C1, and that parent mesh AP 913 has a second different controller 902 denoted C2 in the same mesh domain. One aspect of the present invention includes the child mesh point, when requesting association, asserting that this child wishes to form multiple paths, one to BSSID-M, and the other to BSSID-X. The mechanism described earlier and in FIGS. 4 and 5 can be used to secure the primary link [IS-A, BSSID-M]. It is desired to avoid having to undergo a complete authentication, e.g., full 802.1x EAP authentication to secure the second link. One embodiment of the present invention provides for a single authentication, e.g., 802.1x EAP authentication when the primary path is formed, and includes asserting a key hierarchy to define a root master key and provide for deriving other master keys usable to determine additional transient keys, including a key for the secondary path to the different parent without the child mesh AP having to undergo another full authentication, e.g., 802.1x EAP authentication. Such a mechanism essentially allows both the primary and secondary path from the child mesh AP to two different parent mesh APs to be secured at the same time.

Each parent mesh AP in its neighbor advertisements signals that is capable of forming multiple paths from a child AP by including an information element called a multilink information element ("multipath IE", "MPIE") that advertises its multipath capabilities. The child mesh AP, when it first associates with a controller 901 (C1) via the parent mesh AP 912, indicates that it wishes to form multiple paths including one to another advertised (parent) identity BSSID-X. One embodiment of the invention includes using a special key hierarchy—a multiple-identities-key hierarchy—that provides for multiple paths from the requesting potential child AP. The hierarchy allows different identities (parents of the potential child mesh AP—the IS) on the PTK derivation to be used as long as they are all rooted by the same root master key, PMK-R0, so that multiple paths may be authenticates with only a single full authorization. At the time the child mesh AP initiates association, it asserts that it wishes to use the multiple-identities-key hierarchy, and provides its identity (or identities) and the desired parent mesh AP identities. This allows the child mesh AP to authenticate once, e.g., using EAP with the AAA server coupled to its controller C1. Note that it is assumed that the parent mesh AP 912 has already established secured associations using BSSID-M. At some other time, the same multiple-identities-key hierarchy can be used to derive keys usable for securing a path to another parent. Thus, the child mesh AP 921 wishing to establish a multipath set of links, sends information of the multipath IE heard in the parent mesh AP neighbor advertisements (mesh beacons), including those of parents 912, 913 it wishes to use in the multipath in its first mesh association request message to the parent mesh AP 912. The parent mesh AP 912 forwards the multipath IE in an LWAPP mesh association request it sends to its controller 901 (C1) for this child mesh AP 921. The controller 901 notes that a multipath will be established between the child mesh AP 921 (the IS), parent mesh AP 912 and any another parent mesh AP (913) when it sees the multipath IE in the LWAPP mesh association request message. As will be seen below, the flow is exactly the same when a child mesh AP has formed a new link to the same parent or a new link to a different parent mesh AP. The distinction is made internally at the controller level. That is, in one embodiment, once a controller has determined that a new link to a different parent has been established, it terminates the links from the old parent mesh AP.

Combined Multipath and Multilink Network

Figure 9D:
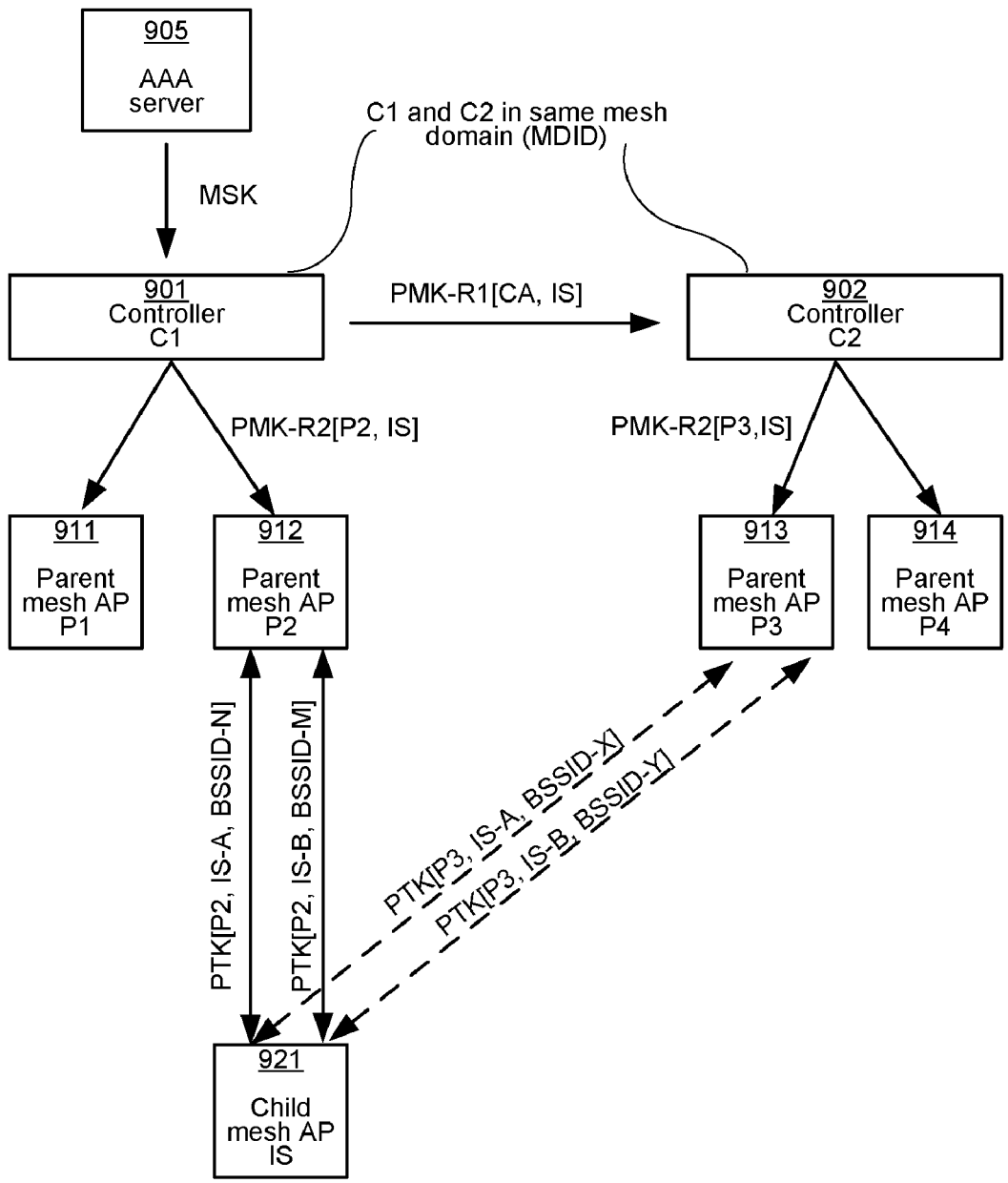
FIG. 9D shows a situation that combines the multilink case of FIG. 9B and the multipath case of FIG. 9C, and wherein security can operate according to an embodiment of the present invention.

FIG. 9D shows a situation that combines the multilink case of FIG. 9B and the multipath case of FIG. 9C. We call the general case "multiple identities mesh links." In this example, the child mesh AP 921 that includes two identities, e.g., two radios or virtual BSSIDs denoted IS-A and IS-B first initiates its association with a controller 901 (C1) via a parent 912 (P2) it selects by listening for its neighbor advertisements. The parent mesh AP 912 in its neighbor advertisements signals that is capable of forming multiple links to a child AP, and announces both its identities (radios or virtual) BSSID-M and BSSID-N. Similarly, the parent mesh AP 913 in its neighbor advertisements signals that is capable of forming multiple links to a child AP, and announces both BSSID-X and BSSID-Y.

Shown in FIG. 9D is the flow of key information used to secure the links for the multiple links, and the paths when alternate parents are used by the child mesh AP 921.

For the remainder of the description, the combined case of multiple links and multiple paths is described. We call this general capability multiple identities. A new information element, a multiple identities information element ("multiple ID IE." "MIDIE") is used by the devices both to advertise their multiple identity capabilities when sending neighborhood advertisements to announce their availability as parent mesh APs, and when requesting association as a child mesh AP to a potential parent mesh AP. The multiple ID IE enumerates (lists) the identities that will be used to establish these multiple links. This multiple ID IE is used by both the child mesh AP as supplicant and parent mesh APs to select and advertise the identities, e.g., MAC addresses used for establishing the multiple links.

Two types of conditions under which multiple links and paths may exist:

1) A single AP may have multiple identities and establish multiple links each using a distinct radio or virtual BSSID of its multiple identities to link with one identity (or more than one identities) of another mesh point. This is multilink.
2) A single radio or single identity of a multiple identity potential child mesh AP may establish multiple paths to multiple parent radios or virtual BSSIDs. This is multi-path. Thus one child or child identity can have more than one parent to form more than one path. Only one path may be active at a time.

In both instances, one embodiment of the invention uses a mechanism that extends what is possible with TG-r to obviate the need for multiple full authentications. The first authentication of a (first) link between a single supplicant identity and a single parent identity with an authenticator, e.g., a controller, is used to establish a single key hierarchy with a root master key for one or more supplicant identities that in the general case may form multiple paths to multiple parent identities. Each controller can then obtain a different next level master key, and similarly each parent identity can then derive a different next level master key via its respective controller. Subsequent links can then be established using the TG-r base mechanism. One implementation includes defining a new IEEE 802.1x AKM (Authentication Key Manager) suite to distinguish the hierarchy as being one that generates an additional level of pairwise master keys: PMK-R2s. Such PMK-R2s are derived via at each parent identity via the respective controller for linking with the one or more one or more supplicant identities. Pairwise transient keys for forming the secure links with the one or more supplicant identities when this AKM is invoked, e.g., via a 4-way exchange, are a function of PMK-R2 rather than PMK-R1 described above for the single link case. These transient keys are obtained without the need to re-undergo a full authentication for any of a plurality of links to the child identities (in the case of multilink) or from a single child identity to a plurality of parents (in the case of multipath).

Those in the art will understand that the state machines operating at a controller and LWAPP state machine are modified as required to allow for the establishment and management of these multiple links, and how to so modify the state machines would be clear from the description herein In the remainder of the description, assume the authentication server, e.g., the authenticator such as the controller coupled to at the AAA server understands during authentication that the requesting identity may be used to establish multiple sessions, e.g., links that are identified by different identities, e.g., MAC addresses. Assume also that the relevant controller is provided the appropriate notification from the AAA server that it is authorized to enable multiple sessions, e.g., links that are identified by different BSSIDs, e.g., MAC addresses. Assume also that the parent mesh AP involved is provided the appropriate notification from the AAA server that it is authorized to enable multiple sessions, e.g., links that are identified by different BSSIDs, e.g., MAC addresses. Assume further that a parent mesh AP advertises both to the child mesh AP and to the controller, e.g., the network authentication server NAS and the AAA server, the parent mesh AP identities that may be used to establish the multiple sessions. Assume also that the child mesh AP signals at the time of initial authentication its intent to establish multiple sessions by explicitly defining the identities of the subsequent or other links. As would be clear, there is logic defined to establish a truncation rule of which identities shall be used if the number of identities between parent and child do not match. That is, if one mesh AP has 8 addresses while its peer has 16, only 8 links may be established and thus the peer's 8 addresses from a pool of 16 is assumed to be clearly defined.

The Key Hierarchy Enhanced for Multiple Identities (Multiple-Identities-Key Hierarchy)

Figure 10:
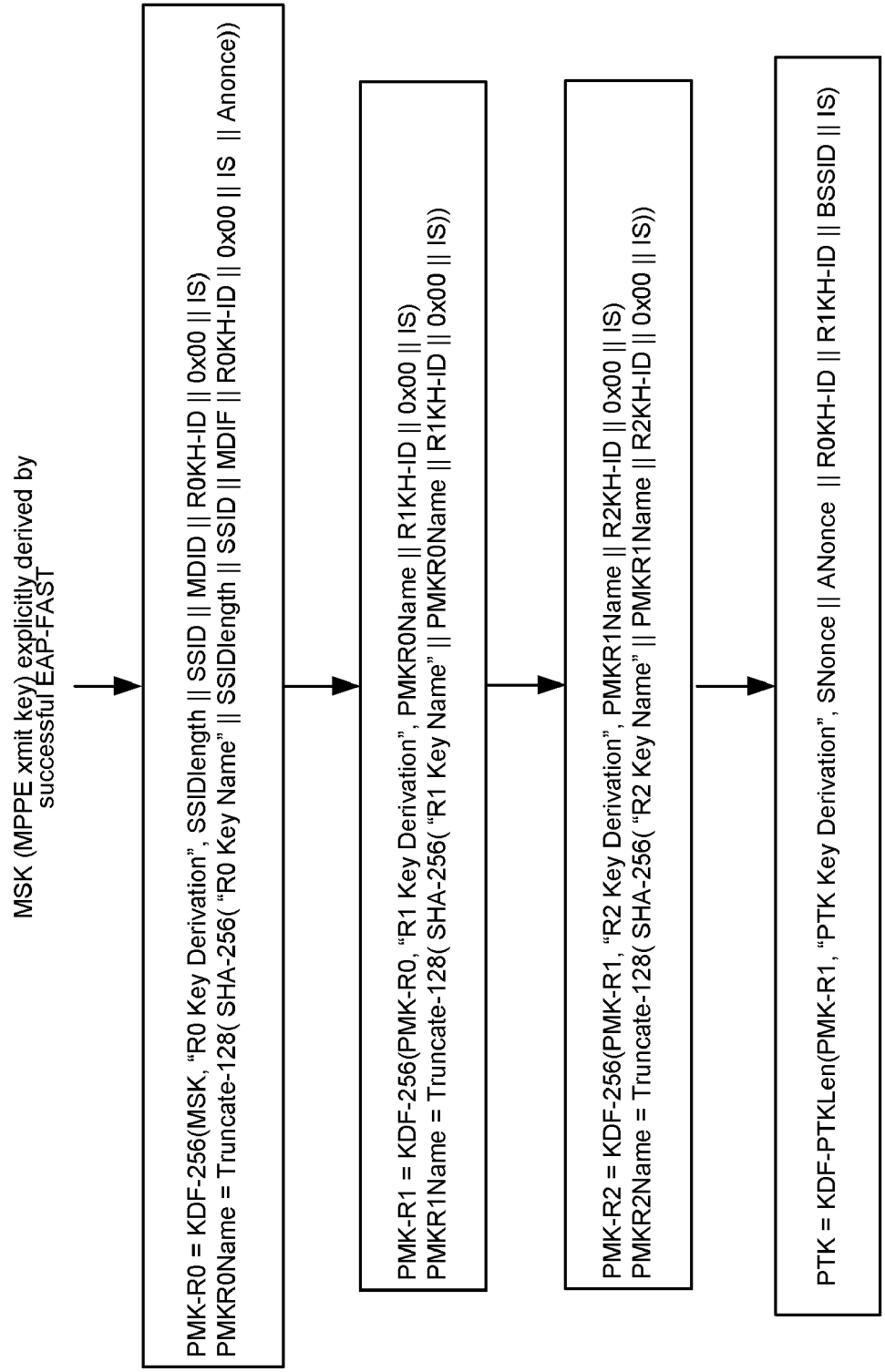
FIG. 10 shows one embodiment of a key hierarchy to handle multiple identity mesh access points, including multipath and multilink and used in an embodiments of the present invention.

One feature of the present invention uses a key hierarchy—the multiple-identities-key hierarchy—that has one more level than the single-link key hierarchy shown in FIG. 6A. Using the additional layer can avoid such scalability issues as forcing the controller to have knowledge of every mesh AP and their BSSID address mapping in the mesh network. FIG. 10 shows one embodiment of such a multiple-identities-key hierarchy, also called a "PMK-R2 key hierarchy" herein,) to handle multiple identity mesh APs, e.g., multiple identity mesh APs that can be mobile, i.e., can roam. The additional layer is for PMK-R2 and provides for a parent mesh APs to establish multiple 1-to-1 security associations between its configured one or more identities, e.g., BSSIDs and the child's one or more identities (BSSIDs).

The inventors note that an alternate embodiment includes using the PMK-R1 to serve the same purpose. Such re-use of the PMK-R1 across multiple parent mesh APs would require proper authorization and thus configuration by the controller, in particular, such re-use of PMK-R1 would require knowledge of the distinct MAC addresses for parent mesh AP at the controller. Thus, one embodiment avoids such re-use of PMK-R1 and introduces a new later—the PMK-R2 layer. The PMK-R2 layer is added to facilitate the distribution of unique keys to both controllers and mesh APs. The implication is to allow for better scalability and allowance for both controllers and mesh APs to receive PMK's and establish PTKs. This is a requirement when parent mesh APs employ the PTK establishment (e.g., 802.11i 4-way handshake or 802.11r base mechanisms).

FIG. 9D described above also shows by simple example how keys may get distributed between two controller controllers 901 (C1) and 902 (C2) to establish multilinks on a single parent mesh AP. In this example, a child mesh AP 921, as supplicant (denoted R0-IS) for the authentication also has multiple identities, denoted IS-A and IS-B, receives the advertisements for parent mesh AP912 (P2) and desires to form multiple links with this parent mesh AP. The child mesh AP 921 first initiates its association with mesh AP 912's controller 901 (C1) and signals its desire to establish multiple links with the parent mesh AP 912. The initial parent mesh AP P2 advertises its multiple identities {BSSID-M, BSSID-N} while parent P-3 advertises identities {BSSID-X, BSSID-Y}. At the time the child, e.g., one of the identities of the child, IS-A, initially associates to P2, it also asserts the use of the multiple-identities-key hierarchy and provides the desired identities {IS-A, IS-B}. This allows the child mesh AP 921 to authenticate only once with the mesh domain so long as it is authorized, for example, so long as the AAA server or the controller acknowledges that the identity used by the child mesh AP may establish multiple links as identified by IS-A and IS-B. In this example, similarly, when the parent mesh AP 912 first authenticated, it became authorizes for multiple link establishment using identities BSSID-M and BSSID-N, so that when it advertises its abilities as a parent, it includes its multiple identities in its neighbor advertisements. The child mesh AP receives such advertisement, and when it requests to be authenticated, e.g., to establish the link between IS-A and BSSID-M, it includes both its two identities IS-A and IS-B, and also includes desired parent identities BSSID-M and BSSID-N. That is, IS-A may continue to establish new secure associations with both BSSID-M and BSSID-N, and there is an established mapping to allow it to establish secure associations using IS-B as well, without requiring a full EAP authentication. An explicit signal and authorization mapping is used for this purpose.

As seen in FIG. 9D, when the child mesh AP 921, identity IS, first undergoes an association e.g., with its radio IS-A with the parent mesh AP 912, an EAP authentication generates a PMK-R0, and for the controller C1, a PMK-R1 is derived denoted PMK-R1 [C1,IS] for the controller C1. A second layer key PMK-R2[P2,IS] is derived between the parent and the controller and passed from the controller for securing connections via each identity of parent mesh AP 912 P2 to each identity of the child mesh AP. This enables a transient key PTK[P2,IS-A,BSSID-M] to be derived for the secure link that includes the link [IS-A,BSSID-M] from the child to the parent. Similarly, assuming both parent identities were first authorized, using PMK-R2[P2,IS] for the second identities can be used to derive another transient key PTK[P2,IS-B, BSSID-N] to secure the link that includes the [IS-B,BSSID-N] from the child to the parent.

Now consider the child mesh AP receiving an advertisement from a different parent mesh AP, P3 (913) that has (and advertises) multiple identities BSSID-X and BSSID-Y. Suppose the child mesh AP wishes to move both it's identities to the identities of this new parent. The child mesh AP sends an association request that includes the two parent identities and its two identities to associate with this new parent. The parent mesh AP 913 receives the association request from the child mesh AP, ascertains that the original controller for the child mesh AP is controller C1. Controller C1 has the key hierarchy for this already authorized multiple identity child—it has stored in it the PMK-R0. The controller C1 derives a PMK-R1 key using the multiple-identities-key hierarchy and passed the PMK-R1 key to this controller C2. The PMK-R1 is denoted PMK-R1[C1,IS]. A second layer key PMK-R2[P3, IS] is derived and passed from the controller C2 to the parent P3 (913) for securing connections via parent mesh AP 913 P3 multiple identities to the multiple identities of the child mesh AP. This PMK-R2[P3,IS] can be used to derive another transient key PTK[P3,IS-A,BSSID-X] for the path from the child mesh using radio IS-A to the parent BSSID-X in parent mesh AP 913, etc. A key for a second link from the child to the same parent, PTK[P3,IS-B,BSSID-Y] also can be derived in the general case that allows both multiple links and multiple paths. Note that these PTKs are derived without requiring the child mesh AP to re-undergo a full authentication.

IEEE 802.11 Enhancements to Support Multiple Links

Support for enabling secure 802.11 associations to be established using a single full authentication, e.g., EAP authentication is achieved in one embodiment by additional advertisements and negotiations during association using an additional type of information element as described herein below.

Multiple Identity Advertisements and the Multiple-Identities IE

In the case that a physical device, e.g., mesh AP may use multiple identities, e.g., MAC addresses to service wireless devices, these multiple identities are in one embodiment explicitly defined during beacons, probe responses and association requests. As stated above, a multiple identities information element ("multiple ID IE." "MIDIE") is used by a device both to advertise its multiple identity capabilities when sending neighborhood advertisements to announce is availability as parent mesh AP, and when requesting association as a child mesh AP. In one embodiment, the multiple ID IE includes a set of fields shown in Table 1 below:

TABLE 1

Multilink Information Element

| Size | Value(hex) | Description |
|---|---|---|
| Uint8 | DD | Vendor specific element ID |
| Uint8 | 05 | Length (variable value subject to change) |
| Uint8 * 3 | 00 40 96 | Organizationally Unique Identifier (OUI) |
| Uint8 | <MLID> | An ID to uniquely identifies the multiple links IE |

TABLE 1-continued

Multilink Information Element

| Size | Value(hex) | Description |
|---|---|---|
| Uint8 | variable | Count: the number of multiple identities used by this device. The count may be 0. |
| Uint8 * 6 * Count | variable | MAC Address list: there is a number = Count of MAC addresses enumerated in this IE |

As an example, in a simple multilink, the Count=1, and the MAC address list is the address of the parent.

Use by a parent: the multiple-identities IE is used by the parent mesh AP in its equivalent (mesh) beacons and probe responses to advertise the available identities, e.g., MAC addresses used by the parent mesh AP. Note that the advertising BSSID need not be included in the multiple-identities IE. The MAC addresses in this list are unique.

Use by a child mesh AP: the multiple-identities IE is used by the child mesh AP in the equivalent initial mesh association request. The child mesh AP includes the multiple-identities IE to assert to the parent mesh its intent to use the multiple-identities-key hierarchy and that there may be future establishment of multiple links with not just the initial BSSID to which the mesh association request is sent but also with the BSSIDs (MAC addresses) included in the multiple-identities IE. In one embodiment, if the multiple-identities IE includes identities, e.g., MAC addresses that are not unique or are not authorized, the parent mesh AP in one embodiment disallows the association by responding with an unsuccessful status result.

PMK-R2 Level Key Hierarchy

In one embodiment, a new AKM (Authentication Key Manager) suite is defined under the Robust Security Network (RSN) information element (RSN IE) to signal use of the multiple-identities-key hierarchy. RSN and the RSN IE are concepts from IEEE 802.11i modified here for mesh network use. The RSN IE for the multiple-identities-key hierarchy is as shown below n Table 2

TABLE 2

RSN IE

| OUI | Selector Type | Authentication Type | Key Management Type |
|---|---|---|---|
| 00:40:96 | S_type | Unspecified authentication over IEEE 802.1X | PMK-R2 Level Key Hierarchy |

In one embodiment, a parent mesh AP includes this AKM value in its RSN IE along with the multiple-identities IE to signal support for multiple links. Similarly, a child mesh AP includes this AKM value in its RSN IE at the equivalent mesh association request when requesting mesh association.

The Initial 4-Way Handshake

Recall that FIG. 4 shows association, authentication, and LWAPP join phases. For the case of multiple identities, in one embodiment, during initial contact, the multiple-identities IE advertised by the parent mesh AP is included in the third message of the 802.11i 4-way handshake so that it may be authenticated.

The IEEE 802.11i four message handshake after the child has associated with the controller and undergone an EAP authentication as the authenticator is as follows:

Message 1: The authenticator provides the child mesh AP with Anonce.

Message 2: The R0-IS (child mesh AP) replies with the child's adjacency header (ADJ_HDR) used by AWPP for mesh backhaul routing), Snonce, the child's Mesh Security Network IE (MSN IE), the child's RSN IE, the child-controller QoSIE, MID ID, MIC used for the authentication. The MID ID of the child included in the association request is also authenticated as a result.

Message 3: The authenticator provides the child mesh AP with the parent's ADJ_HDR, the parent's ADJ_UPD_HDR that includes elements used by AWPP not related to security, Anonce, the parent's MSN IE, the parent's RSN IE, the parent's QoSIE, the parent's MID ID, and MIC used for the authentication. The MID ID of the parent mesh AP included in the original neighbor is also authenticated as a result.

Message Exchange for Establishing a Secure Multiple Link

The initial association enables the establishment of a secure PTK between a child mesh BSSID and a parent mesh BSSID. At the same time, the other identities, as presented in the MID IEs the first contact, are authenticated. For a subsequent different child identity or a different parent mesh AP identity or both different parent and different child AP identities, different keys are derived using a TG-r—like flow using the single multiple-identities-key hierarchy of FIG. 10 that was established the first time the child mesh AP underwent a full authentication.

Figure 11:
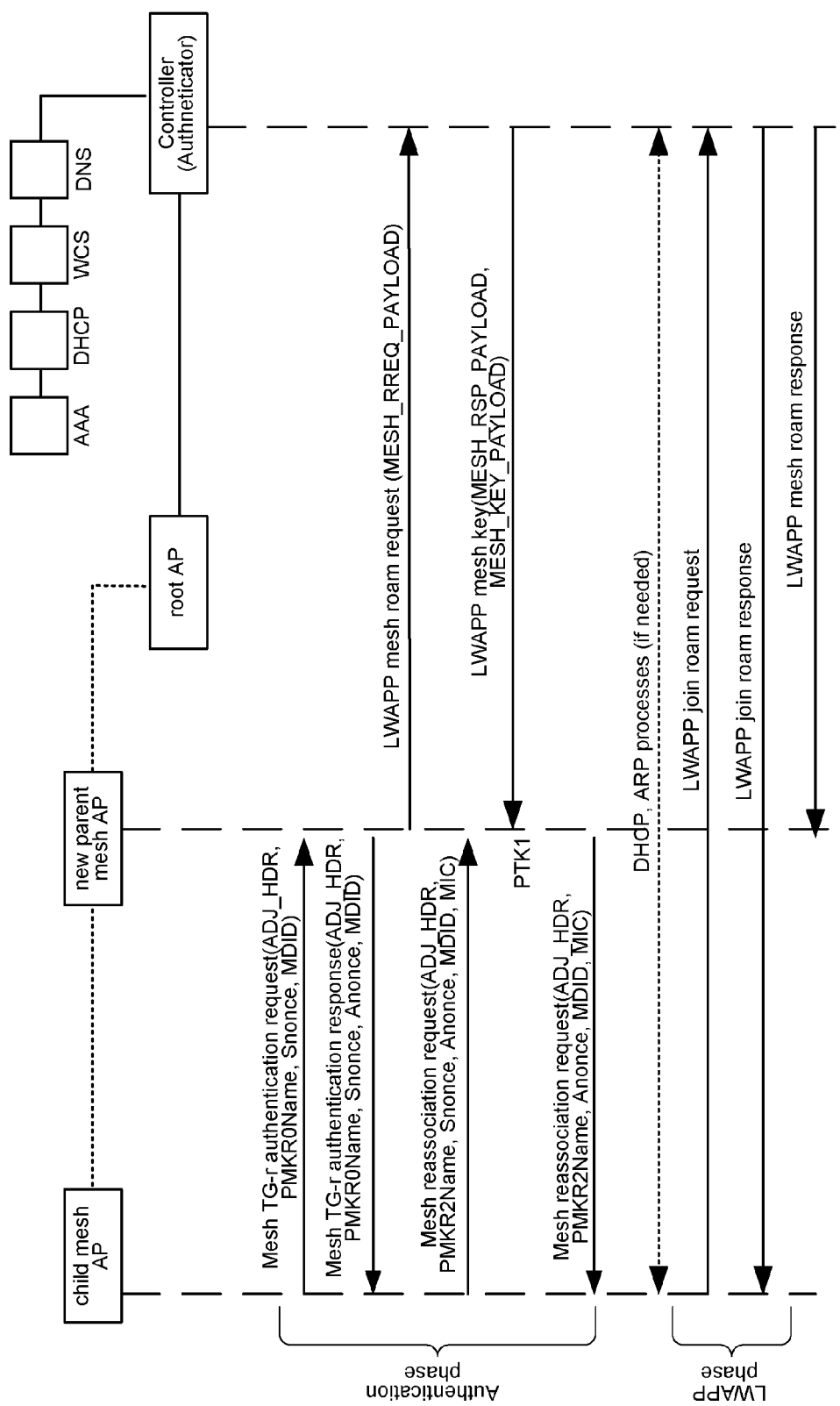
FIG. 11 shows an example information flow for multiple link association wherein a single controller is used, after an initial association and authentication, according to an embodiment of the present invention.

FIG. 11 shows an example information flow for PMK-R2 multiple link association wherein a single controller is used, after an initial association and authentication. Note the similarity to the message flow of a roam shown in FIG. 7. Note also that during the association (a re-association message) instead of asserting PMKR1Name as the key to use for PTK, as the single link version, in the multiple link case, the PMKR2Name is used.

In more detail, the child mesh AP—the supplicant—initiates the authentication by sending a Mesh TG-r Authentication Request to the parent mesh AP with its SNONCE and PMKR0Name, and mesh domain ID. The mesh TG-r mesh authentication requests indicated that the child mesh AP wishes to join a new parent. Mesh beacons of a parent that supports multiple paths or multiple links includes the multiple-identities IE. In one embodiment, the beacons also include its mesh domain ID and R0KH-ID.

The new parent mesh AP replies with its ANONCE and echoes the SNONCE, PMKR0Name and mesh domain ID by sending a Mesh TG-r authentication response message to the supplicant—the child mesh AP, and generates an LWAPP mesh roam request message to the parent mesh AP's controller to ensure that the child mesh AP requesting re-authentication is indeed authentic and authorized by requesting the PTK that corresponds to the new parent mesh AP and the child mesh AP.

If the new parent mesh AP and the supplicant—the child mesh AP share the same controller, the controller may preserve the LWAPP session, e.g., may buffer all frames for it, being aware that the child mesh point is roaming and it generates the next PTK locally. The parent mesh AP's controller may then generate the parent mesh AP's (and child mesh AP's) PTK, and replies with an LWAPP mesh roam reply message confirming the supplicant (child) mesh point's identity and includes the PTK derived locally in the message.

The child mesh AP (the supplicant mesh point), in the meantime, sends a mesh reassociation request message to the NEW parent mesh AP, proving authenticity and liveness of the session by including the PMKR2Name and authenticating the mesh reassociation request message.

The new parent AP waits for its controller's response before it replies (the wait may not be necessary as the reply may already have been approved), and then replies with a mesh reassociation response message to the roaming child mesh AP. Once the new parent AP has received the PTK from its controller, it may then validate the PMKR2Name and the MIC used to authenticate the mesh reassociation request packet. If both are valid, the mesh point responds with an authenticated mesh reassociation response message.

Once the child mesh AP—the supplicant—receives the successful mesh reassociation response message, it waits until the LWAPP tunnel has been established or updated.

An Example of Multiple Paths:

The following describes an example of establishing multi-paths. Consider a potential child mesh AP that is configured to be part of a multipath mesh network such that the mesh AP can have a plurality of alternate parent mesh APs in the multipath mesh network. Consider a first parent mesh AP or mesh AP identity, and a second parent mesh AP, or mesh AP identity, each mesh AP or identity configured to be mesh APs or mesh AP identities that are part of multiple paths of a multipath mesh network, each configured to send neighbor advertisements that announce their multipath capabilities using a multiple identities information element, and each being part of the same mesh domain. Suppose the potential child mesh AP receives neighbor advertisements from the first and second parent mesh APs. The first time the potential child mesh AP associates with the first parent mesh AP to join the mesh network, its association request includes announcing its ability to have multiple parents in multiple paths, and include the multiple identities information elements received from the first and second parent mesh APs (or A identities). This announces that a multiple-identities-key hierarchy is to be used for this child mesh AP so that the child mesh AP need only undergo one authentication. The controller of the first parent mesh AP (or AP identity) receives the association request, and ascertains that the association request is approved. Thereafter, the (potential) child mesh AP undergoes an authentication, e.g., a certificate-based backend mutual authentication with the authentication server, e.g., AAA via the controller. This results in defining a multiple-identities-key hierarchy for this child mesh AP, and a first pairwise master key of the multiple-identities-key hierarchy. A first 4-way exchange occurs between the child mesh AP and the first parent mesh AP and forms a transient key via the first parent mesh AP using the multiple-identities-key hierarchy. At some later time, the child mesh AP desires to form an alternate path via the second parent mesh AP (or second mesh AP identity), it undergoes a TG-r-like roam association request to associate with the second parent mesh AP. The second parent mesh AP determines the key hierarchy and obtains via its controller the appropriate level pairwise master key. The child mesh AP and the second parent mesh AP undergo a 4-way exchange to derive a transient key using the multiple-identities-key hierarchy to secure the link via the second parent mesh AP. Because the child mesh AP was preciously authorized, the change to the second parent does not require a full authentication.

Roaming with Secure Multiple Links

Note that mobility with multiple secure links is feasible with proper care. So long as the controller is managing the multiple associations and ensuring that active associations from one parent AP are properly terminated when a child mesh AP has transitioned to a new parent. The flow remains as in FIG. 11, and there is no literal 802.11 distinction when a child mesh AP has established a new link in the same physical AP or a different parent. The distinction is made internally by the controller. That is, once the controller determines that a new link to a different parent has been established, in one embodiment, it terminates the links from the old parent mesh AP.

LWAPP Controller

The controller acts as the central agent for managing the multiple active 802.11 associations that a child mesh AP may hold with a parent mesh AP. Thus, during association, the MESH_REQ_PAYLOAD includes the multiple-identities IE information of the association request as well as the multiple-identities IE information—unless already provisioned in the controller,—to ensure the links are not being redundantly established or so that the controller can acknowledge when a new link, e.g., to a new parent mesh AP, is being established.

AAA Server and Network Access Server (NAS)

To complete the ease of configuration and manageability, in one implementation, the AAA server is used, the network access server (NAS) include a RADIUS attribute (AVP) that conveys the multiple-identities IE information of both the network access server (802.1X Authenticator) and the multiple-identities IE provided by the client so that the AAA server may provide appropriate authorization of the identities provided. In lieu of this, the controller may act as such an agent and thus its authorization list includes the BSSIDs that map to every certificate issued for each mesh AP.

Thus, a method has been described wherein a unified approach is used to securing all mesh backhaul links by authenticating once with the network, e.g. using IEEE 801.1x EAP methods such as EAP-FAST, deriving a set of master keys and then using local key management, with the same parent mesh AP or a different parent mesh AP to derive session keys for each type of links, e.g., single, multilink and multipath, without having to carry out a full authentication or derive new master keys, a process which may involve between 10 to 20 handshakes for different types of links, thereby reducing the initial link setup time as well as link re-setup times with roams and/or link changes caused by RF reasons.

Note that one embodiment described herein uses a multiple-identities IE that can handle all cases such as: 1) multiple links between a parent and a child, 2) multiple paths between a child and a plurality of parents, and 3) multiple paths between each identity of a plurality of identities of a child and a plurality of identities of distinct parents, i.e., a combination of multiple paths and multiple links. One alternate embodiment for multiple paths uses instead an information element for multiple paths, called a multiple path information element that lists the parent identities of the alternate paths. Another embodiment for multiple links uses instead an information element for multiple links called a multiple links information element. One alternate embodiment, instead of using a single information element that can handle all cases, uses a different information element for multiple paths—a multiple path information element, and a different information element for multiple links—a multiple link information element, and allows both types of information elements to co-exist. How to modify the description herein to handle one type or another would be clear to those in the art, so is not described further herein.

In one embodiment, a computer-readable carrier medium carries a set of instructions that when executed by one or more processors of a mesh point cause the one or more processors to carry out a method in the mesh point as described herein.

While in one embodiment, the authentication is mutual authentication, and in particular embodiments, it is certificate-based mutual authentication, the invention is not limited to such authentication.

By the authenticator in the mesh network is meant the same authenticator or an authenticator reachable by all the parent mesh points in the network, such that there should be a trust relationship between each parent mesh point and the authenticator. Furthermore, in one embodiment, the parent mesh point and the authenticator are authorized to issue a transient key to each of the parent mesh points, per the key hierarchy.

In the description herein, and in the claims, the term substantially conforming to a standard, or to a standard protocol, or to a standard 4-way exchange, etc. is used. By "substantially" conforming is meant conforming to the overall structure, but one or more of adding one or more frame types not in the standard; modifying one or more frame types that are in the standard; adding at least one information element not in the standard to one or more frame types; adding one information element in the standard; adding at least one field not described in the standard; adding one or more authentication key management suites not in the standard; modifying the order of an exchange defined in the standard, using a conforming exchange defined in the standard, but with the entities somewhat different than defined in the standard. In most cases, a substantially conforming protocol would accept data that conforms to the standard, but not all features might be implemented. Such a meaning of substantially conforming would be well understood by those of ordinary skill in the art. As examples, the additional frame types, additional fields, and the type of exchanges defined herein may not all be strictly in conformance of the IEEE 802.11 standard. However, each are included in the term "substantially conforming" For example, an IEEE 802.11i 4-way handshake that is initiated by a child mesh AP as supplicant substantially conforms to the IEEE 802.11i standard.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of the IEEE 802.11 standard, the invention is not limited to such contexts and may be utilized in various other applications and systems, whether conforming to a wireless standard, or specially designed. Furthermore, the invention is not limited to any one type of architecture or protocol, and thus, may be utilized in conjunction with one or a combination of other architectures/protocols. For example, the invention may be embodied in transceivers conforming to other standards and for other applications, including other WLAN standards, Bluetooth, GSM, PHS, CDMA, and other cellular wireless telephony standards. While an embodiment has been described for operation in a transceiver with RF frequencies in the 5 GHz range and 2.4 GHz range (the 802.11a and 802.11g variants of the IEEE 802.11 standard), the invention may be embodied in receivers and transceivers operating in other RF frequency ranges. Applications that can be accommodated include IEEE 802.11 wireless LANs and links, wireless Ethernet, HIPERLAN 2, WiMAX, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Note that the description has been mostly for mesh APs that are controlled by a controller with which the mesh AP has a secure link, e.g., a secure tunnel such as an LWAPP/CAPWAP tunnel. First, the invention is also applicable to mesh points that do not include access point functionality—such mesh points are still called mesh AP in the above description. Furthermore, the invention is also applicable to mesh points that are not "lightweight" but rather include enough capability not to need an LWAPP or other protocol connection for a controller to function. For example, in the case that access point capability is included, the invention is applicable also to mesh APs that are not lightweight APs.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of mesh point. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, (i) in one set of embodiment, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a mesh point, the method comprising:

the mesh point associating with a first parent mesh point of a wireless mesh network as a child mesh point to the first parent mesh point, the first parent mesh point having a secure tunnel to a controller acting as an authenticator or agent therefor, the first parent mesh point being a member of a mesh domain of the mesh network, the controller to centrally control a plurality of mesh points of the mesh domain, including controlling authentication of the plurality of mesh points and including controlling access point capability of the plurality of-mesh points of the mesh domain, the controlling using control frames conforming to a wireless access point control and provisioning protocol designed for controlling access point capability, a secure tunnel between the first parent mesh point and the controller being established by an authentication between the first parent mesh point as supplicant and the controller as authenticator or agent therefor, such that in the case the first parent mesh point has access point capability, the access point capability is controlled by the controller, the associating comprising receiving a response from the controller via the first parent mesh point as a result of the first parent mesh point sending an association request to the controller;

the child mesh point as supplicant undergoing an authentication with the controller as authenticator or agent therefor via the first parent mesh point of the mesh domain, such that the child mesh point and the controller establish trust, the authentication resulting in a root pairwise master key of a multiple-identities-key hierarchy; and undergoing a 4-way handshake with the controller via the first parent mesh point, the 4-way handshake initiated by the child mesh point as supplicant and the controller as authenticator or agent therefor using the multiple-identities-key hierarchy to determine a transient key for the child mesh point to securely communicate with the first parent mesh point in the mesh network.

2. A method as recited in claim 1, wherein the authentication is mutual authentication.

3. A method as recited in claim 1, wherein the authentication is a certificate-based mutual authentication.

4. A method as recited in claim 1, wherein the child mesh point includes access point functionality, the method further comprising:

once the link between the child mesh point and the first parent mesh point is secured, the child mesh point joining the controller by forming a secure tunnel to the controller via the first parent mesh point such that the child mesh point can function as an access point controlled by the controller using the protocol.

5. A method in a mesh point comprising:
the mesh point associating with a first parent mesh point of a wireless mesh network as a child mesh point, the first parent mesh point having a secure tunnel to a first controller acting as an authenticator or agent therefor in a mesh domain of the network, the first controller to centrally control a first plurality of the mesh points of the mesh domain, including controlling authentication of the first plurality of the mesh points and including controlling access point capability of the first plurality of the mesh points of the mesh domain, the controlling using control frames conforming to a wireless access point control and provisioning protocol designed for controlling access point capability, a secure tunnel between the first parent mesh point and the first controller being established by an authentication between the first parent mesh point as supplicant and the first controller as authenticator or agent therefor;
the child mesh point as supplicant undergoing an authentication to the mesh domain with first controller as authenticator via the first parent mesh point of the mesh network, such that the child mesh point and the first controller establish trust, the authentication resulting in a first pairwise master key that is a root of a multiple-identities-key hierarchy, the hierarchy being usable to define how to determine derived master keys based on the first pairwise master key that is the result of the authentication; and
undergoing a 4-way handshake initiated by the child mesh point as supplicant and the controller as authenticator or agent therefor to determine a transient key for the child mesh point to securely communicate with the first parent mesh point in the mesh network,
such that a new link between the child mesh point and a new different parent mesh point is securable by a new pairwise transient key determined according to the multiple-identities-key hierarchy without the child mesh point needing to re-undergo a full authentication.

6. A method as recited in claim 5, wherein the authentication is mutual authentication.

7. A method as recited in claim 5, wherein the authentication is a certificate-based mutual authentication.

8. A method as recited in claim 5, wherein the authentication is an IEEE 802.1x Extensible Authentication Protocol authentication.

9. A method as recited in claim 5, wherein the child mesh point includes access point functionality, the method further comprising:
once the link between the child mesh point and the first parent mesh point is secured, the child mesh point joining the first controller by forming a secure tunnel to the first controller via the first parent mesh point such that the child mesh point can function as an access point.

10. A method as recited in claim 5, further comprising the child mesh point rejoining the mesh network via a second parent mesh point of the mesh domain, the second parent mesh point having a secure tunnel to the first controller, the rejoining including associating with the second parent mesh point and securing the link between the child mesh point and the second parent mesh point using a new pairwise transient key determined according to the multiple-identities-key hierarchy without the child mesh point re-undergoing an authentication, the associating comprising receiving a response from the first controller via the second parent mesh point as a result of the second parent mesh point sending an association request to the first controller.

11. A method as recited in claim 5,
wherein the child mesh point is a mesh point that is configured to be part of a multipath mesh network such that the child mesh point can have a plurality of alternate parent mesh points or mesh point identities in the multipath mesh network,
wherein the first parent mesh point and a second parent mesh point, or a first and a second identity of the first or second mesh point are each configured to be mesh points or mesh point identities that are part of multiple paths of a multipath mesh network, and configured to send neighbor advertisements that announce their multipath capabilities using a multiple identities information element;
wherein the child mesh point associating with the first parent mesh point is as a result of the child mesh point receiving neighbor advertisements from the first and second parent mesh points or mesh point identities and includes the child mesh point announcing its ability to have multiple parents in multiple paths, and sending a multiple identities information element received from the first and second parent mesh points or identities to announce that an multiple-identities-key hierarchy is to be used;
wherein the child mesh point undergoing the authentication results in the first pairwise master key that is in the multiple-identities-key hierarchy; and
wherein the first 4-way handshake is for the first parent mesh point or an identity thereof and forms a transient key via the first parent mesh point,
such that an alternate path from the child mesh point via the second parent mesh point or identity is securable by a new pairwise transient key determined according to the key hierarchy without the child mesh point needing to re-undergo a full authentication.

12. A method as recited in claim 5,
wherein the child mesh point is a mesh point that is configured to have multiple identities,
wherein the child mesh point associating with the first parent mesh point is for a first child mesh point identity of the child mesh point associating with a first identity of the first parent mesh point and is a result of the child mesh point receiving neighbor advertisements from the first parent mesh point and includes the child mesh point announcing its multiple identities by sending its multiple identities information element to announce that a multiple-identities-key hierarchy is to be used;
wherein the child mesh point undergoing the authentication results in the first pairwise master key that is the root of the multiple-identities-key hierarchy; and
wherein the first 4-way handshake is for the first parent mesh point and forms a transient key via the first parent mesh point between the first child mesh point identity and the first parent mesh point,
such that a new link between a different identity of the child mesh point and the first parent mesh point is securable by a new pairwise transient key determined according to the key hierarchy without the child mesh point needing to re-undergo a full authentication.

13. A method as recited in claim 5, further comprising:
the child mesh point rejoining the mesh network via a second parent mesh point, including associating with the second parent mesh point and securing the link between the child mesh point and the second parent mesh point using a new pairwise transient key determined according to the key hierarchy without the child mesh point re-undergoing an authentication.

14. A method as recited in claim 13, wherein the child mesh point includes access point functionality controlled by a controller to which it has a secure tunnel, the controlling using a-the wireless access point control and provisioning protocol and wherein the second parent mesh point has a secure tunnel to a second controller in the same mesh domain using the wireless access point control and provisioning protocol, the method further comprising:

once a link between the child mesh point and the first parent mesh point is secured, the child mesh point joining the first controller by forming a secure tunnel to the first controller via the first parent mesh point such that the child mesh point can function as an access point controlled by the first controller; and once the link between the child mesh point and second parent mesh point is secured, the child mesh point forming a secure tunnel to the second controller in the same mesh domain via the second parent mesh point such that the child mesh point can function as an access point controlled by the second controller.

15. A method as recited in claim 5, wherein the wireless mesh network is a mesh network substantially conforming to the IEEE 802.11 standard, and wherein the 4-way handshake is substantially an IEEE 801.11i 4-way handshake, with the child mesh point initiating the 4-way handshake as supplicant.

16. A method in a child mesh point, the child mesh point having a plurality of identities, the method comprising:

receiving a neighbor advertisement from a first parent mesh point of a wireless mesh network, the first parent mesh point part of a mesh domain of mesh points and having a secure tunnel to a controller, the controller to centrally control a plurality of the mesh points of the mesh domain, including controlling authentication of the plurality of the mesh points by being an authenticator of the mesh domain or an agent for the authenticator, the controlling using control frames conforming to a wireless access point control and provisioning protocol designed for controlling access point capability, the controlling further including controlling access point capability of the plurality of the mesh points of the mesh domain, a secure tunnel between a particular mesh point and the controller being established by an authentication between the particular mesh point as supplicant and the controller as authenticator or agent therefor;

sending an association request to the first parent mesh point, the association request including a multiple identities information element listing the multiple identities of the child mesh point;

receiving an authentication response from the first parent mesh point as a result of the first parent mesh point sending a request to the controller for the child mesh point, and receiving a response from the controller that the child mesh point may associate with the first parent mesh point;

undergoing an authentication with the child mesh point as supplicant and the controller as authenticator or agent therefor, the authentication being via the first parent mesh point, the authentication resulting in a first pairwise master key usable to generate a multiple-identities-key hierarchy, wherein the authentication including authenticating the multiple identities listed in the multiple identities information element and resulting in an authorization to use the multiple-identities-key hierarchy to derive keys for securing links between any of the multiple identities and the parent mesh point;

using the multiple-identities-key hierarchy of derived keys to determine one or more derived master keys based on the first pairwise master key that is the result of the authentication and authorization; and undergoing a 4-way handshake initiated by the child mesh point as supplicant to determine a transient key for a selected identity of the child mesh point to secure communication between the selected identity and the first parent mesh point in the mesh network, such that a new link between a different identity of the child mesh point and the first parent mesh point is securable by a new pairwise transient key determined according to the key hierarchy without the child mesh point needing to re-undergo a full authentication.

17. A method as recited in claim 16, wherein the authentication is a certificate-based mutual authentication.

18. A method as recited in claim 16, wherein the authentication is an IEEE 802.1x Extensible Authentication Protocol authentication.

19. A method as recited in claim 16, wherein the child mesh point is a mesh point that is configured to be part of a multipath mesh network such that the child mesh point can have a plurality of alternate parent mesh points or mesh point identities in the multipath mesh network, wherein the first parent mesh point and a second parent mesh point, or a first and a second identity of the first or second mesh point are each configured to be mesh points or mesh point identities that are part of multiple paths of a multipath mesh network, and configured to send neighbor advertisements that announce their multipath capabilities using a multiple identities information element;

wherein the child mesh point associating with the first parent mesh point is as a result of the child mesh point receiving neighbor advertisements from the first and second parent mesh points or mesh point identities and includes the child mesh point announcing its ability to have multiple parents in multiple paths, and sending a multiple identities information element received from the first and second parent mesh points or identities to announce that an multiple-identities-key hierarchy is to be used;

wherein the child mesh point undergoing the authentication results in the first pairwise master key that is in the multiple-identities-key hierarchy; and wherein the first 4-way handshake is for the first parent mesh point or an identity thereof and forms a transient key via the first parent mesh point, such that an alternate path from the child mesh point via the second parent mesh point or identity is securable by a new pairwise transient key determined according to the key hierarchy without the child mesh point needing to re-undergo a full authentication.

20. A method as recited in claim 16, wherein the first mesh point includes access point functionality controlled by the controller using the protocol, the method further comprising:

once a link between the first mesh point and the first parent mesh point is secured, the first mesh point joining the controller by forming a secure tunnel to the controller via the first parent mesh point such that the first mesh point can function as an access point.

21. A method as recited in claim 16, further comprising:

a different one of the child mesh point's identities joining the mesh network, including associating with the first parent mesh point and securing the link between the different identity and the first parent mesh point using a new pairwise transient key determined according to the key hierarchy without the child mesh point re-undergoing an authentication.

22. A method as recited in claim 16, wherein the wireless mesh network is a mesh network substantially conforming to the IEEE 802.11 standard, and wherein the 4-way handshake is substantially an IEEE 801.11i 4-way handshake, with the child mesh point initiating the 4-way handshake as supplicant.

23. A method in a child mesh point comprising:
receiving one or more advertisements from one or more parent mesh points of a wireless mesh network, each parent mesh point being in a particular mesh domain of mesh points, each parent mesh point having a secure tunnel to one of a set of one or more controllers each configured to centrally control a plurality of the mesh points of the particular mesh domain, including controlling authentication of the plurality of mesh points and including controlling access point capability of the plurality of mesh points of the particular mesh domain, the controlling using control frames conforming to a wireless access point control and provisioning protocol designed for controlling access point capability, a secure tunnel between a particular mesh point and a particular controller being established by an authentication between the particular mesh point as supplicant and the particular controller as authenticator or agent therefor, an advertisement from a parent mesh point that has a plurality of identities including a multiple identities information element listing the multiple identities of the parent mesh point, the one or more advertisements including a multipath indication to indicate that the respective parent mesh point allows association from a child mesh point on a path of a plurality of paths;
sending an association request to a first parent mesh point, the first parent mesh point being one whose advertisement was received and whose advertisement includes a multipath indication, the first parent mesh point having a secure tunnel to a first controller of the particular mesh domain, the association request including a multiple identities information element listing the multiple identities of the plurality of parents of the multiple paths that the child mesh point desires to have;
receiving a response to the association request as a result of the first parent mesh point sending a request to the first controller, and the first parent mesh point receiving a request response from the first controller;
undergoing an authentication as supplicant with the first controller as authenticator or agent therefor via the first parent mesh point, the authentication resulting in a first pairwise master key usable to generate a multiple-identities-key hierarchy, wherein the authentication including authenticating the multiple paths between the child mesh point and the parent mesh point identities listed in the multiple identities information element and resulting in an authorization to use the multiple-identities-key hierarchy to derive keys for securing links between the child mesh point and any of the parent mesh point identities;
using the multiple-identities-key hierarchy of derived keys to determine one or more derived master keys based on the first pairwise master key that is the result of the authentication and authorization;
undergoing a 4-way handshake initiated by the child mesh point as supplicant to determine a transient key to secure communication between the selected identity and the first parent mesh point in the mesh network,
such that a new path between a the child mesh point and a different parent mesh point identity is securable by a new pairwise transient key determined according to the key hierarchy without the child mesh point needing to re-undergo a full authentication.

24. A method as recited in claim 23, wherein the authentication is a certificate-based mutual authentication.

25. A method as recited in claim 23, wherein the authentication is an IEEE 802.1x Extensible Authentication Protocol authentication.

26. A method as recited in claim 23, wherein the child mesh point includes access point functionality controlled by the first controller using the protocol, the method further comprising:
once the link between the child mesh point and the first parent mesh point is secured, the child mesh point joining the first controller by forming a secure tunnel to the controller via the first parent mesh point such that the child mesh point can function as an access point.

27. A method as recited in claim 23, further comprising the child mesh point rejoining the mesh network via a second parent mesh point or second mesh point identity of the particular mesh domain, including associating with the second parent mesh point or identity and securing the link between the child mesh point and the second parent mesh point or identity using a new pairwise transient key determined according to the multiple-identities-key hierarchy without the child mesh point re-undergoing an authentication.

28. A method as recited in claim 23, wherein the child mesh point includes access point functionality controlled by the first controller using the protocol, wherein the first parent mesh point has a secure tunnel to the first controller using the protocol, and wherein the second parent mesh point has a secure tunnel to a second controller in the particular mesh domain using the protocol,
the method further comprising:
once the link between the child mesh point and the first parent mesh point is secured, the child mesh point joining the first controller by forming a secure tunnel to the controller via the first parent mesh point such that the child mesh point can function as an access point; and
once the link between the child mesh point and second parent mesh point or parent mesh point identity is secured, the child mesh point re-joining a controller in the particular mesh domain by re-forming the secure tunnel to the controller in the particular mesh domain via the second parent mesh point such that the child mesh point can function as an access point.

29. A method as recited in claim 23, wherein the wireless mesh network is a mesh network substantially conforming to the IEEE 802.11 standard, and wherein the 4-way handshake is substantially an IEEE 801.11i 4-way handshake, with the child mesh point initiating the 4-way handshake as supplicant.

30. A method in a child mesh point comprising:
(a) the child mesh point associating with a first parent mesh point of a wireless mesh network, the first parent mesh point having a secure tunnel to a controller of a mesh domain of mesh points, the controller to centrally control a plurality of the mesh points of the mesh domain, including controlling authentication of the plurality of the mesh points and including controlling access point capability of the plurality of mesh points of the mesh domain, the controlling using control frames conforming to a wireless access point control and provisioning protocol designed for controlling access point capability, a secure tunnel between a particular mesh point and the controller being established by an authentication between the particular mesh point as supplicant and the controller as authenticator or agent therefor, the associating comprising receiving a response from the controller via the first parent mesh point as a result of the first parent mesh point sending an association request to the controller, wherein one or both of the child mesh point or the first parent mesh point has multiple identities, wherein the first parent mesh point is one of a set of one or more parent mesh points to which the first mesh point requests to form one or more paths, wherein one or more of the following is true:
- the first parent mesh point has one or multiple identities, the first parent mesh point allows association from a child on a path of a plurality of paths, and the child mesh point desires to authenticate multiple paths including a path to the first parent mesh point,
- the child mesh point has multiple identities, and the child mesh point desires to authenticate multiple links via its multiple identities, including associating one of its links with the first parent mesh point or with an identity of the first parent mesh point in the case the parent mesh point has multiple identities, wherein, in the case that the first parent mesh point has multiple identities, the associating including the child mesh point responding to receiving a neighbor advertisement from the first parent mesh point that included a multiple identities information element listing the multiple identities of the first parent mesh point, wherein, in the case that the first parent mesh point allows association from a child on a path of a plurality of paths and the child mesh point desires to associate with the first parent mesh point or with an identity of the first parent mesh point to form one of multiple paths to a respective plurality of parent mesh points or mesh point identities, the associating including the child mesh point responding to receiving a neighbor advertisement from the first parent mesh point that included an indication that the first parent mesh point accepts multiple path associations, and the associating including sending an association request to the first parent mesh point that includes a multiple identities information element listing the multiple identities of the plurality of parent mesh points or parent identities of the multiple paths;

wherein in the case the child mesh point has multiple identities, the associating including sending an association request to the first parent mesh point that includes a multiple identities information element listing the multiple identities of the child mesh point, and (b) as a result of receiving a response to the association request, the response a result of the first parent mesh point sending a request to the controller and the first parent mesh point receiving from the controller a request response to the request, the child mesh point undergoing an authentication as supplicant with the controller as authenticator or agent therefor via the first parent mesh point, the authentication resulting in a first pairwise master key usable to generate a multiple-identities-key hierarchy, wherein the authentication including authenticating the multiple identities listed in the multiple identities information element or elements and resulting in an authorization to use the multiple-identities-key hierarchy to derive keys for securing links that include any of the multiple identities;

(c) using the multiple-identities-key hierarchy of derived keys to determine one or more derived master keys based on the first pairwise master key that is the result of the authentication and authorization;

(d) undergoing a 4-way handshake initiated by the child mesh point as supplicant and the controller as authenticator or agent therefor to determine a transient key to secure communication between the child mesh point or an identity thereof in the case of a multiple identity child mesh point and the first parent mesh point in the mesh network, such that a new link between the child mesh point or a different identity of the child mesh point in the case of a multiple identities child mesh point, and the first parent mesh point, or a different parent mesh point of parent mesh point identity in the case of multiple path to multiple parent mesh points or identities is securable by a new pairwise transient key determined according to the key hierarchy without the child mesh point needing to re-undergo a full authentication.

31. A method as recited in claim 30, wherein the authentication is a certificate-based mutual authentication.

32. A tangible computer-readable storage medium on which are encoded instructions that when executed by one or more processors of a processing system in a mesh point cause the mesh point to carry out a method comprising:

the mesh point associating with a first parent mesh point of a wireless mesh network as a child mesh point, the first parent mesh point having a secure tunnel to a first controller acting as an authenticator or agent therefor, the first parent mesh point being in a mesh domain of mesh points of the wireless mesh network, the first controller to centrally control first plurality of the mesh points of the mesh domain, including controlling authentication of the first plurality of the mesh points and including controlling access point capability of the first plurality of the mesh points of the mesh domain, the controlling using control frames conforming to a wireless access point control and provisioning protocol designed for controlling access point capability, a secure tunnel between a particular mesh point and the first controller being established by an authentication between the particular mesh point as supplicant and the first controller as authenticator or agent therefor, the associating comprising receiving a response from the first controller via the first parent mesh point as a result of the first parent mesh point sending an association request to the first controller;

the child mesh point as supplicant undergoing an authentication to the mesh domain with the first controller as authenticator or agent therefor via the first parent mesh point of the mesh network, such that the child mesh point and the first controller establish trust, the authentication resulting in a first pairwise master key that is a root of a multiple-identities-key hierarchy, the hierarchy being usable to define how to determine derived master keys based on the first pairwise master key that is the result of the authentication; and undergoing a 4-way handshake with the first controller via the first parent mesh point, the 4-way handshake initiated by the child mesh point as supplicant and the first controller as authenticator or agent therefor to determine a transient key for the child mesh point to securely communicate with the first parent mesh point in the mesh network, such that a new link between the child mesh point and a new different parent mesh point is securable by a new pairwise transient key determined according to the multiple-identities-key hierarchy without the child mesh point needing to re-undergo a full authentication.

33. A tangible computer-readable storage medium as recited in claim 32, wherein the authentication is a certificate-based mutual authentication.

34. A tangible computer-readable storage medium as recited in claim 32, wherein the child mesh point includes access point functionality controlled by the first controller using the protocol, the method further comprising:
   once the link between the child mesh point and the first parent mesh point is secured, the child mesh point joining the first controller by forming a secure tunnel to the first controller via the first parent mesh point such that the child mesh point can function as an access point controlled by the first controller using the wireless access point control and provisioning protocol.

35. A tangible computer-readable storage medium as recited in claim 32,
   wherein the child mesh point is a mesh point that is configured to be part of a multipath mesh network such that the child mesh point can have a plurality of alternate parent mesh points or mesh point identities in the multipath mesh network, each parent mesh point having a secure tunnel to the first or another controller,
   wherein the first parent mesh point and a second parent mesh point, or a first and a second identity of the first or second mesh point are each configured to be mesh points or mesh point identities that are part of multiple paths of a multipath mesh network, and configured to send neighbor advertisements that announce their multipath capabilities using a multiple identities information element;
   wherein the child mesh point associating with the first parent mesh point is as a result of the child mesh point receiving neighbor advertisements from the first and second parent mesh points or mesh point identities and includes the child mesh point announcing its ability to have multiple parents in multiple paths, and sending a multiple identities information element received from the first and second parent mesh points or identities to announce that an multiple-identities-key hierarchy is to be used;
   wherein the child mesh point undergoing the authentication results in the first pairwise master key that is in the multiple-identities-key hierarchy; and
   wherein the first 4-way handshake is for the first parent mesh point or an identity thereof and forms a transient key via the first parent mesh point,
   such that an alternate path from the child mesh point via the second parent mesh point or identity is securable by a new pairwise transient key determined according to the key hierarchy without the child mesh point needing to re-undergo a full authentication.

36. A tangible computer-readable storage medium as recited in claim 32,
   wherein the child mesh point is a mesh point that is configured to have multiple identities,
   wherein the child mesh point associating with the first parent mesh point is for a first child mesh point identity of the child mesh point associating with a first identity of the first parent mesh point and is a result of the child mesh point receiving neighbor advertisements from the first parent mesh point and includes the child mesh point announcing its multiple identities by sending its multiple identities information element to announce that a multiple-identities-key hierarchy is to be used;
   wherein the child mesh point undergoing the authentication results in the first pairwise master key that is the root of the multiple-identities-key hierarchy; and
   wherein the first 4-way handshake is for the first parent mesh point and forms a transient key via the first parent mesh point between the first child mesh point identity and the first parent mesh point,
   such that a new link between a different identity of the child mesh point and the first parent mesh point is securable by a new pairwise transient key determined according to the key hierarchy without the child mesh point needing to re-undergo a full authentication.

37. A tangible computer-readable storage medium on which are encoded instructions that when executed by one or more processors of a processing system in a child mesh point, the child mesh point having a plurality of identities, cause the mesh point to carry out a method comprising:
   receiving a neighbor advertisement from a first parent mesh point of a wireless mesh network, the first parent mesh point part of a mesh domain of mesh points and having a secure tunnel to a controller, the controller to centrally control a plurality of the mesh points of the mesh domain, including controlling authentication of the plurality of the mesh points by being an authenticator of the mesh domain or an agent for the authenticator, the controlling using control frames conforming to a wireless access point control and provisioning protocol designed for controlling access point capability, the controlling further including controlling access point capability of the plurality of the mesh points of the mesh domain, a secure tunnel between a particular mesh point and the controller being established by an authentication between the particular mesh point as supplicant and the controller as authenticator or agent therefor;
   sending an association request to the first parent mesh point, the association request including a multiple identities information element listing the multiple identities of the child mesh point;
   receiving an authentication response from the first parent mesh point as a result of the first parent mesh point sending a request to the controller for the child mesh point, and receiving a response from the controller that the child mesh point may associate with the first parent mesh point;
   undergoing an authentication with the child mesh point as supplicant and the controller as authenticator or agent therefor, the authentication being via the first parent mesh point, the authentication resulting in a first pairwise master key usable to generate a multiple-identities-key hierarchy, wherein the authentication including authenticating the multiple identities listed in the multiple identities information element and resulting in an authorization to use the multiple-identities-key hierarchy to derive keys for securing links between any of the multiple identities and the parent mesh point;
   using the multiple-identities-key hierarchy of derived keys to determine one or more derived master keys based on the first pairwise master key that is the result of the authentication and authorization; and
   undergoing a 4-way handshake initiated by the child mesh point as supplicant to determine a transient key for a selected identity of the child mesh point to secure communication between the selected identity and the first parent mesh point in the mesh network, such that a new link between a different identity of the child mesh point and the first parent mesh point is securable by a new pairwise transient key determined according to the key hierarchy without the child mesh point needing to re-undergo a full authentication.

38. A tangible computer-readable storage medium on which are encoded instructions that when executed by one or more processors of a processing system in a mesh point cause the mesh point to carry out a method comprising:

receiving one or more advertisements from one or more parent mesh points of a wireless mesh network, each parent mesh point being in a particular mesh domain of mesh points, each parent mesh node having a secure tunnel to one of a set of one or more controllers each configured to centrally control a respective plurality of the mesh points of the particular mesh domain, including controlling authentication of the mesh points and including controlling access point capability of the respective plurality of mesh points of the particular mesh domain, the controlling using control frames conforming to a wireless access point control and provisioning protocol designed for controlling access point capability, a secure tunnel between a particular mesh point and a particular controller being established by an authentication between the particular mesh point as supplicant and the particular controller as authenticator or agent therefor, an advertisement from a parent mesh point that has a plurality of identities including a multiple identities information element listing the multiple identities of the parent mesh point, the one or more advertisements including a multipath indication to indicate that the respective parent mesh point allows association from a child mesh point on a path of a plurality of paths;

sending an association request to a first parent mesh point, the first parent mesh point being one whose advertisement was received and whose advertisement includes a multipath indication, the first parent mesh point having a secure tunnel to a first controller of the particular mesh domain, the association request including a multiple identities information element listing the multiple identities of the plurality of parents of the multiple paths that the child mesh point desires to have;

receiving a response to the association request as a result of the first parent mesh node sending a request to the first controller, and the first parent mesh node receiving a request response from the first controller;

undergoing an authentication as supplicant with the first controller as authenticator or agent therefor via the first parent mesh point, the authentication resulting in a first pairwise master key usable to generate a multiple-identities-key hierarchy, wherein the authentication including authenticating the multiple paths between the child mesh point and the parent mesh point identities listed in the multiple identities information element and resulting in an authorization to use the multiple-identities-key hierarchy to derive keys for securing links between the child mesh point and any of the parent mesh point identities;

using the multiple-identities-key hierarchy of derived keys to determine one or more derived master keys based on the first pairwise master key that is the result of the authentication and authorization;

undergoing a 4-way handshake initiated by the child mesh point as supplicant to determine a transient key to secure communication between the selected identity and the first parent mesh point in the mesh network, such that a new path between a the child mesh point and a different parent mesh point identity is securable by a new pairwise transient key determined according to the key hierarchy without the child mesh point needing to re-undergo a full authentication.

39. A tangible computer-readable storage medium on which are encoded instructions that when executed by one or more processors of a processing system in a child mesh point cause the mesh point to carry out a method comprising:

(a) the child mesh point associating with a first parent mesh point of a wireless mesh network, the first parent mesh point having a secure tunnel to a first controller of a mesh domain of mesh points, the first controller to centrally control first plurality of the mesh points of the mesh domain, including controlling authentication of the first plurality of the mesh points and including controlling access point capability of the first plurality of the mesh points of the mesh domain, the controlling using control frames conforming to a wireless access point control and provisioning protocol designed for controlling access point capability, a secure tunnel between a particular mesh point and the first controller being established by an authentication between the particular mesh point as supplicant and the first controller as authenticator or agent therefor, the associating comprising receiving a response from the first controller via the first parent mesh point as a result of the first parent mesh point sending an association request to the first controller, wherein one or both of the child mesh point or the first parent mesh point has multiple identities, wherein the first parent mesh point is one of a set of one or more parent mesh points to which the first mesh point requests to form one or more paths, wherein one or more of the following is true:
the first parent mesh point has one or multiple identities, the first parent mesh point allows association from a child on a path of a plurality of paths, and the child mesh point desires to authenticate multiple paths including a path to the first parent mesh point,
the child mesh point has multiple identities, and the child mesh point desires to authenticate multiple links via its multiple identities, including associating one of its links with the first parent mesh point or with an identity of the first parent mesh point in the case the parent mesh point has multiple identities, wherein, in the case that the first parent mesh point has multiple identities, the associating including the child mesh point responding to receiving a neighbor advertisement from the first parent mesh point that included a multiple identities information element listing the multiple identities of the first parent mesh point, wherein, in the case that the first parent mesh point allows association from a child on a path of a plurality of paths and the child mesh point desires to associate with the first parent mesh point or with an identity of the first parent mesh point to form one of multiple paths to a respective plurality of parent mesh points or mesh point identities, the associating including the child mesh point responding to receiving a neighbor advertisement from the first parent mesh point that included an indication that the first parent mesh point accepts multiple path associations, and the associating including sending an association request to the first parent mesh point that includes a multiple identities information element listing the multiple identities of the plurality of parent mesh points or parent identities of the multiple paths;

wherein in the case the child mesh point has multiple identities, the associating including sending an association request to the first parent mesh point that includes a multiple identities information element listing the multiple identities of the child mesh point, and (b) as a result of receiving a response to the association request, the response a result of the first parent mesh point sending a request to the first controller and the first parent mesh point receiving from the controller a request response to the request, the child mesh point undergoing an authentication as supplicant with the first controller as authenticator or agent therefor via the first parent mesh point, the authentication resulting in a first pairwise master key usable to generate a multiple-identities-key hierarchy, wherein the authentication including authenticating the multiple identities listed in the multiple identities information element or elements and resulting in an authorization to use the multiple-identities-key hierarchy to derive keys for securing links that include any of the multiple identities;

(c) using the multiple-identities-key hierarchy of derived keys to determine one or more derived master keys based on the first pairwise master key that is the result of the authentication and authorization;

(d) undergoing a 4-way handshake initiated by the child mesh point as supplicant and the first controller as authenticator or agent therefor to determine a transient key to secure communication between the child mesh point or an identity thereof in the case of a multiple identity child mesh point and the first parent mesh point in the mesh network, such that a new link between the child mesh point or a different identity of the child mesh point in the case of a multiple identities child mesh point, and the first parent mesh point, or a different parent mesh point of parent mesh point identity in the case of multiple path to multiple parent mesh points or identities is securable by a new pairwise transient key determined according to the key hierarchy without the child mesh point needing to re-undergo a full authentication.

40. An apparatus in a mesh point comprising:
one or more processors;
one or more storage media coupled to the one or more processors and on which is encoded logic configured to cause, when executed by at least one of the processors, the mesh point to:
associate with a first parent mesh point of a wireless mesh network as a child mesh point, the first parent mesh point having a secure tunnel to a first controller acting as an authenticator or agent therefor, the first parent mesh point being in a mesh domain of mesh points of the wireless mesh network, the first controller to centrally control a first plurality of the mesh points of the mesh domain, including controlling authentication of the first plurality of the mesh points and including controlling access point capability of the first plurality of the mesh points of the mesh domain, the controlling using control frames conforming to a wireless access point control and provisioning protocol designed for controlling access point capability, a secure tunnel between a particular mesh point and the first controller being established by an authentication between the particular mesh point as supplicant and the first controller as authenticator or agent therefor, the associating comprising receiving a response from the first controller via the first parent mesh point as a result of the first parent mesh point sending an association request to the first controller;

undergo as supplicant an authentication to the mesh domain with the first controller as authenticator or agent therefor via the first parent mesh point of the mesh network, such that the child mesh point and the first controller establish trust, the authentication resulting in a first pairwise master key that is a root of a multiple-identities-key hierarchy, the hierarchy being usable to define how to determine derived master keys based on the first pairwise master key that is the result of the authentication; and undergo a 4-way handshake as supplicant with the first controller as authenticator or agent therefor via the first parent mesh point, the 4-way handshake to determine a transient key for the child mesh point to securely communicate with the first parent mesh point in the mesh network, such that a new link between the child mesh point and a new different parent mesh point is securable by a new pairwise transient key determined according to the multiple-identities-key hierarchy without the child mesh point needing to re-undergo a full authentication.

41. An apparatus as recited in claim 40, wherein the child mesh point includes access point functionality controlled by the first controller using the wireless access point control and provisioning protocol, the logic further configured when executed to cause the mesh point to join the first controller once the link between the child mesh point and the first parent mesh point is secured, the joining the controller including forming a secure tunnel to the controller via the first parent mesh point such that the child mesh point can function as an access point.

42. An apparatus as recited in claim 40,
wherein the child mesh point is a mesh point that is configured to be part of a multipath mesh network such that the child mesh point can have a plurality of alternate parent mesh points or mesh point identities in the multipath mesh network, each parent mesh point having a secure tunnel to the first or another controller,
wherein the first parent mesh point and a second parent mesh point, or a first and a second identity of the first or second mesh point are each configured to be mesh points or mesh point identities that are part of multiple paths of a multipath mesh network, and configured to send neighbor advertisements that announce their multipath capabilities using a multiple identities information element;
wherein the child mesh point associating with the first parent mesh point is as a result of the child mesh point receiving neighbor advertisements from the first and second parent mesh points or mesh point identities and includes the child mesh point announcing its ability to have multiple parents in multiple paths, and sending a multiple identities information element received from the first and second parent mesh points or identities to announce that an multiple-identities-key hierarchy is to be used;
wherein the child mesh point undergoing the authentication results in the first pairwise master key that is in the multiple-identities-key hierarchy; and
wherein the first 4-way handshake is for the first parent mesh point or an identity thereof and forms a transient key via the first parent mesh point,
such that an alternate path from the child mesh point via the second parent mesh point or identity is securable by a new pairwise transient key determined according to the key hierarchy without the child mesh point needing to re-undergo a full authentication.

43. An apparatus as recited in claim 40,
wherein the child mesh point is a mesh point that is configured to have multiple identities,
wherein the child mesh point associating with the first parent mesh point is for a first child mesh point identity of the child mesh point associating with a first identity of the first parent mesh point and is a result of the child mesh point receiving neighbor advertisements from the first parent mesh point and includes the child mesh point announcing its multiple identities by sending its multiple identities information element to announce that a multiple-identities-key hierarchy is to be used;
wherein the child mesh point undergoing the authentication results in the first pairwise master key that is the root of the multiple-identities-key hierarchy; and
wherein the first 4-way handshake is for the first parent mesh point and forms a transient key via the first parent mesh point between the first child mesh point identity and the first parent mesh point,
such that a new link between a different identity of the child mesh point and the first parent mesh point is securable by a new pairwise transient key determined according to the key hierarchy without the child mesh point needing to re-undergo a full authentication.

44. An apparatus in a child mesh point having a plurality of identities, the apparatus comprising:
one or more processors;
one or more storage media coupled to the one or more processors and on which is encoded logic configured to cause, when executed by at least one of the processors, the mesh point to:
receive a neighbor advertisement from a first parent mesh point of a wireless mesh network, the first parent mesh point part of a mesh domain and having a secure tunnel to a controller, the controller to centrally control the mesh points of the mesh domain, including controlling authentication of the mesh points by being an authenticator of the mesh domain or an agent for the authenticator, the controlling using control frames conforming to a wireless access point control and provisioning protocol designed for controlling access point capability, the controlling further including controlling access point capability of the mesh points of the mesh domain, a secure tunnel between a particular mesh point and the controller being established by an authentication between the particular mesh point as supplicant and the controller as authenticator or agent therefor;
send an association request to the first parent mesh point, the association request including a multiple identities information element listing the multiple identities of the child mesh point;
receive an authentication response from the first parent mesh point as a result of the first parent mesh point sending a request to the controller for the child mesh point, and receiving a response from the controller that the child mesh point may associate with the first parent mesh node;
undergo an authentication as supplicant with the controller as authenticator or agent therefor, the authentication being via the first parent mesh point, the authentication resulting in a first pairwise master key usable to generate a multiple-identities-key hierarchy, wherein the authentication including authenticating the multiple identities listed in the multiple identities information element and resulting in an authorization to use the multiple-identities-key hierarchy to derive keys for securing links between any of the multiple identities and the parent mesh point;
use the multiple-identities-key hierarchy of derived keys to determine one or more derived master keys based on the first pairwise master key that is the result of the authentication and authorization; and
undergo a 4-way handshake initiated by the child mesh point as supplicant to determine a transient key for a selected identity of the child mesh point to secure communication between the selected identity and the first parent mesh point in the mesh network,
such that a new link between a different identity of the child mesh point and the first parent mesh point is securable by a new pairwise transient key determined according to the key hierarchy without the child mesh point needing to re-undergo a full authentication.

45. An apparatus in a mesh point comprising:
one or more processors;
one or more storage media coupled to the one or more processors and on which is encoded logic configured to cause, when executed by at least one of the processors, the mesh point to:
receive one or more advertisements from one or more parent mesh points of a wireless mesh network, each parent mesh point being in a particular mesh domain of mesh points, each parent mesh node having a secure tunnel to one of a set of one or more controllers each configured to centrally control one or more of the mesh points of the particular mesh domain, including controlling authentication of the mesh points and including controlling access point capability of one or more mesh points of the particular mesh domain, the controlling using control frames conforming to a wireless access point control and provisioning protocol designed for controlling access point capability, a secure tunnel between a particular mesh point and a particular controller being established by an authentication between the particular mesh point as supplicant and the particular controller as authenticator or agent therefor, an advertisement from a parent mesh point that has a plurality of identities including a multiple identities information element listing the multiple identities of the parent mesh point, the one or more advertisements including a multipath indication to indicate that the respective parent mesh point allows association from a child mesh point on a path of a plurality of paths;
send an association request to a first parent mesh point, the first parent mesh point being one whose advertisement was received and whose advertisement includes a multipath indication, the first parent mesh point having a secure tunnel to a first controller of the mesh domain, the association request including a multiple identities information element listing the multiple identities of the plurality of parents of the multiple paths that the child mesh point desires to have;
receive a response to the association request as a result of the first parent mesh node sending a request to the first controller, and the first parent mesh node receiving a request response from the first controller;
undergo an authentication as supplicant with the first controller as authenticator or agent therefor via the first parent mesh point, the authentication resulting in a first pairwise master key usable to generate a multiple-identities-key hierarchy, wherein the authentication including authenticating the multiple paths between the child mesh point and the parent mesh point identities listed in the multiple identities information element and resulting in an authorization to use the multiple-identities-key hierarchy to derive keys for securing links between the child mesh point and any of the parent mesh point identities;

use the multiple-identities-key hierarchy of derived keys to determine one or more derived master keys based on the first pairwise master key that is the result of the authentication and authorization;

undergo a 4-way handshake initiated by the child mesh point as supplicant to determine a transient key to secure communication between the selected identity and the first parent mesh point in the mesh network, such that a new path between a the child mesh point and a different parent mesh point identity is securable by a new pairwise transient key determined according to the key hierarchy without the child mesh point needing to re-undergo a full authentication.

* * * * *

UNITED STATES PATENT AND TRADEMARK OFFICE
CERTIFICATE OF CORRECTION

| | | |
|---|---|---|
| PATENT NO. | : 8,037,305 B2 | Page 1 of 1 |
| APPLICATION NO. | : 11/771027 | |
| DATED | : October 11, 2011 | |
| INVENTOR(S) | : Rahman et al. | |

It is certified that error appears in the above-identified patent and that said Letters Patent is hereby corrected as shown below:

In Column 35, line 6, before "wireless access point", kindly replace "a-the" with --the--.

In Column 40, line 35, after "control", kindly insert --a--.

In Column 44, line 14, after "control", kindly insert --a--.

Signed and Sealed this
Sixth Day of December, 2011

David J. Kappos
*Director of the United States Patent and Trademark Office*